United States Patent
Kim et al.

(10) Patent No.: US 9,936,411 B2
(45) Date of Patent: Apr. 3, 2018

(54) METHOD FOR RADIO RESOURCE MEASUREMENT IN WIRELESS ACCESS SYSTEM SUPPORTING CARRIER AGGREGATION, AND APPARATUS SUPPORTING SAME

(71) Applicant: LG Electronics Inc., Seoul (KR)

(72) Inventors: Bonghoe Kim, Seoul (KR); Byounghoon Kim, Seoul (KR); Yunjung Yi, Seoul (KR); Joonkui Ahn, Seoul (KR)

(73) Assignee: LG Electronics Inc., Seoul (KR)

(*) Notice: Subject to any disclaimer, the term of this patent is extended or adjusted under 35 U.S.C. 154(b) by 245 days.

(21) Appl. No.: 14/760,850

(22) PCT Filed: Jan. 27, 2014

(86) PCT No.: PCT/KR2014/000748
§ 371 (c)(1),
(2) Date: Jul. 14, 2015

(87) PCT Pub. No.: WO2014/116069
PCT Pub. Date: Jul. 31, 2014

(65) Prior Publication Data
US 2015/0358848 A1    Dec. 10, 2015

Related U.S. Application Data

(60) Provisional application No. 61/756,474, filed on Jan. 25, 2013.

(51) Int. Cl.
*H04W 24/10* (2009.01)
*H04W 56/00* (2009.01)
*H04L 5/00* (2006.01)

(52) U.S. Cl.
CPC .......... *H04W 24/10* (2013.01); *H04L 5/0048* (2013.01); *H04L 5/0053* (2013.01); *H04W 56/001* (2013.01)

(58) Field of Classification Search
CPC .. H04W 24/10; H04W 56/001; H04L 5/0048; H04L 5/0053
See application file for complete search history.

(56) References Cited

U.S. PATENT DOCUMENTS

| | | | | |
|---|---|---|---|---|
| 2013/0279437 A1* | 10/2013 | Ng | .................. | H04W 48/16 370/329 |
| 2014/0119266 A1* | 5/2014 | Ng | .................. | H04L 1/0061 370/312 |

(Continued)

FOREIGN PATENT DOCUMENTS

CN    102638840 A    8/2012

OTHER PUBLICATIONS

New Postcom, "CRS based RRM measurement for unsynchronised new carriers," R1-124947, 3GPP TSG RAN WG1 Meeting #71, New Orleans, Nov. 12-16, 2012.

(Continued)

*Primary Examiner* — Ian N Moore
*Assistant Examiner* — Ronald H Davis
(74) *Attorney, Agent, or Firm* — Dentons US LLP

(57) ABSTRACT

The present invention relates to methods for making radio resource measurements in synchronized cells when quasi co-location is applied, and to apparatuses supporting same. A method for a terminal for making radio resource measurements (RRM) in a wireless access system according to one embodiment of the present invention may comprise the steps of: receiving an upper level signal comprising a reference signal for channel state information (CSI-RS) of a first cell, and quasi co-location (QCL) information for a (Continued)

cell-specific reference signal (CRS) and/or CSI-RS of a second cell; receiving the CRS and/or CSI-RS of the second cell on the basis of the QCL information; and measuring a first RRM for the first cell by means of the CRS and/or the CSI-RS of the second cell.

12 Claims, 16 Drawing Sheets

(56) References Cited

U.S. PATENT DOCUMENTS

2014/0198763 A1* 7/2014 Sorrentino ............. H04B 7/024
 370/330
2014/0204919 A1* 7/2014 Chen ................. H04W 56/0005
 370/336
2015/0341882 A1* 11/2015 Davydov ............ H04W 72/042
 370/336

OTHER PUBLICATIONS

Samsung, "Remaining issues on quasi co-location between CS1-RS, CRS and DMRS," R1-124558, 3GPP TSG-RAN WG1 Meeting #70bis, San Diego, USA, Oct. 8-12, 2012.
Ericsson, "On New Carrier Type," R1-125357, 3GPP TSG RAN WG1 Meeting #71, New Orleans, USA, Nov. 12-16, 2012.
Ericsson, et al., "Discussion on Antenna Ports Co-location," R1-121026, 3GPP TSG RAN WG1 Meeting #68bis, Jeju, Korea, Mar. 26-30, 2012.
Alcatel-Lucent et al., "Remaining aspects of Quasi-co-located Antenna Ports," R1-124409, 3GPP TSG-RAN WG1 Meeting #70bis, San Diego, USA, Oct. 8-12, 2012.

* cited by examiner

Normal CP

METHOD FOR RADIO RESOURCE MEASUREMENT IN WIRELESS ACCESS SYSTEM SUPPORTING CARRIER AGGREGATION, AND APPARATUS SUPPORTING SAME

This application is a 35 USC §371 National Stage entry of International Application No. PCT/KR2014/000748 filed on Jan. 27, 2014, and claims priority to U.S. Provisional Application No. 61/756,474 filed on Jan. 25, 2013, all of which are hereby incorporated by reference in their entireties as if fully set forth herein.

TECHNICAL FIELD

The present invention relates to a wireless access system and, more particularly, to methods for performing Radio Resource Measurement (RRM) in a synchronized cell when Quasi Co-Location (QCL) is applied and apparatuses supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

An object of the present invention is to provide an efficient data transmission method in a carrier aggregation environment.

Another object of the present invention is to provide methods for performing RRM in a synchronized cell to which QCL is applied.

Another object of the present invention is to provide a method for setting cyclic prefix lengths of a synchronized cell and a non-synchronized cell when QCL is applied.

Another object of the present invention is to provide a method for allocating cell identifiers of a synchronized cell and a non-synchronized cell when QCL is applied.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present invention provides methods for performing RRM in a synchronized cell when QCL is applied and apparatuses supporting the same.

In an aspect of the present invention, a method for performing Radio Resource Measurement (RRM) by a User Equipment (UE) in a radio access system is provided. The method may include receiving a higher layer signal including information about Quasi Co-Location (QCL) between a Channel State Information Reference Signal (CSI-RS) of a first cell and a Cell-specific Reference Signal (CRS) and/or a CSI-RS of a second cell, receiving the CRS and/or the CSI-RS of the second cell based on the information about QCL, and performing first RRM for the first cell using the CRS and/or the CSI-RS of the second cell.

Synchronization for the first cell may be maintained using a synchronization signal transmitted in the second cell.

The method may further include performing second RRM for the first cell using the CSI-RS of the first cell.

The first RRM may include one or more of Reference Signal Received Power (RSRP) measurement and Path Loss (PL) measurement, and the second RRM may include one or more of Reference Signal Received Quality (RSRQ) and PL measurement.

The first cell may be a synchronized cell in which a synchronization signal is not transmitted, the second cell may be a synchronization reference cell in which the synchronization signal is transmitted, and the UE may not receive a downlink signal from the first cell while the UE receives the CRS and/or the CSI-RS of the second cell from the second cell.

The first cell may be a New Carrier Type (NCT) to which one or more of a synchronization signal, a CRS, a downlink broadcast channel, and a downlink control channel are not allocated, and the second cell may be a legacy serving cell.

In another aspect of the present invention, a User Equipment (UE) for performing Radio Resource Measurement (RRM) in a radio access system is provided. The UE may include a transmission module, a reception module, and a processor supporting RRM.

The processor may be configured to receive a higher layer signal including information about Quasi Co-Location (QCL) between a Channel State Information Reference Signal (CSI-RS) of a first cell and a Cell-specific Reference Signal (CRS) and/or a CSI-RS of a second cell through the reception module, receive the CRS and/or the CSI-RS of the second cell based on the information about QCL through the reception module, and perform first RRM for the first cell using the CRS and/or the CSI-RS of the second cell.

Synchronization for the first cell may be maintained using a synchronization signal transmitted in the second cell.

The processor may be configured to further perform second RRM for the first cell using the CSI-RS of the first cell.

The first RRM may include one or more of Reference Signal Received Power (RSRP) measurement and Path Loss (PL) measurement, and the second RRM may include one or more of Reference Signal Received Quality (RSRQ) and PL measurement.

The first cell may be a synchronized cell in which a synchronization signal is not transmitted, the second cell may be a synchronization reference cell in which the synchronization signal is transmitted, and the UE may not receive a downlink signal from the first cell while the UE receives the CRS and/or the CSI-RS of the second cell from the second cell.

The first cell may be a New Carrier Type (NCT) to which one or more of a synchronization signal, a CRS, a downlink broadcast channel, and a downlink control channel are not allocated, and the second cell may be a legacy serving cell.

The afore-described aspects of the present disclosure are merely a part of embodiments of the present disclosure. Those skilled in the art will derive and understand various embodiments reflecting the technical features of the present disclosure from the following detailed description of the present disclosure.

Advantageous Effects

According to the embodiments of the present disclosure, the following effects can be achieved.

First, downlink data can be efficiently transmitted and received in a carrier aggregation environment.

Second, RRM can be performed in a synchronized cell to which QCL is applied.

Third, timing synchronization can be accurately obtained and maintained by setting a cyclic prefix length between a synchronized cell and a non-synchronized cell when QCL is applied.

Fourth, a cell identifier shortage problem can be solved by setting a cell identifier of a synchronized cell according to a non-synchronized cell when QCL is applied.

It will be appreciated by persons skilled in the art that that the effects that can be achieved through the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
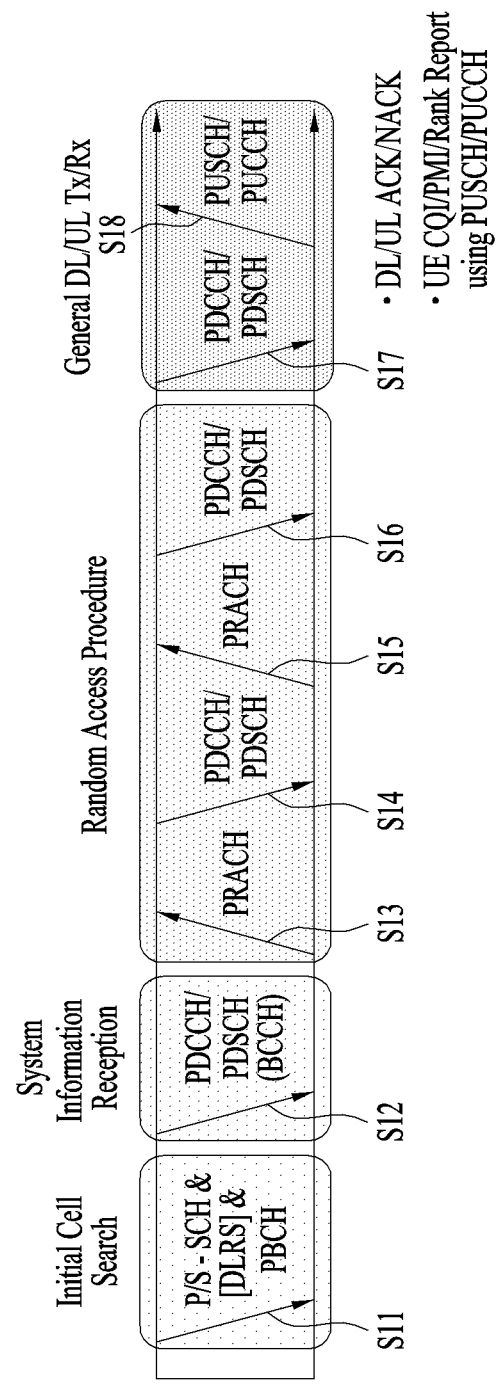
FIG. 1 illustrates physical channels and a general signal transmission method using the physical channels.

The present invention provides methods for performing Radio Resource Measurement (RRM) in a synchronized cell when Quasi Co-Location (QCL) is applied and apparatuses performing the same.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, and 3GPP TS 36.321. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the invention.

The following detailed description includes specific terms in order to provide a thorough understanding of the present disclosure. However, it will be apparent to those skilled in the art that the specific terms may be replaced with other terms without departing the technical spirit and scope of the present disclosure. In addition, all of the terms disclosed by the present description can be explained based on the standard specification documents.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB. During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
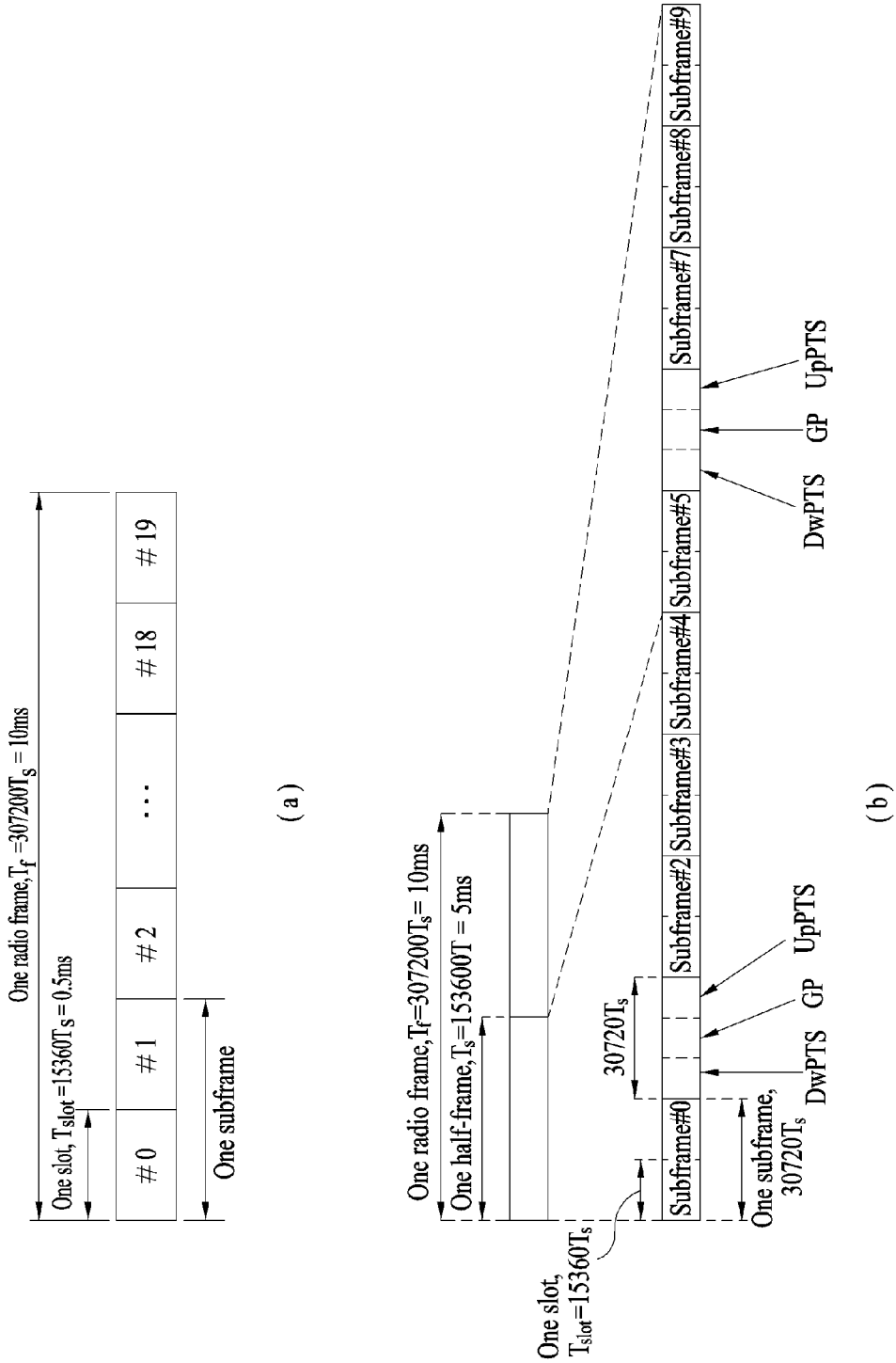
FIG. 2 illustrates radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms ($T_f=307200 \cdot T_s$) long, including equal-sized 20 slots indexed from 0 to 19. Each slot is 0.5 ms ($T_{slot}=15360 \cdot T_s$) long. One subframe includes two successive slots. An $i^{th}$ subframe includes $2i^{th}$ and $(2i+1)^{th}$ slots. That is, a radio frame includes 10 subframes. A time required for transmitting one subframe is defined as a Transmission Time Interval (TTI). $T_s$ is a sampling time given as $T_s=1/(15 \text{ kHz} \times 2048)=3.2552 \times 10^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f=307200 \cdot T_s$) long, including two half-frames each having a length of 5 ms ($=153600 \cdot T_s$) long. Each half-frame includes five subframes each being 1 ms ($=30720 \cdot T_s$) long. An $i^{th}$ subframe includes $2i^{th}$ and $(2i+1)^{th}$ slots each having a length of 0.5 ms ($T_{slot}=15360 \cdot T_s$). $T_s$ is a sampling time given as $T_s=1/(15 \text{ kHz} \times 2048)=3.2552 \times 10^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 3:
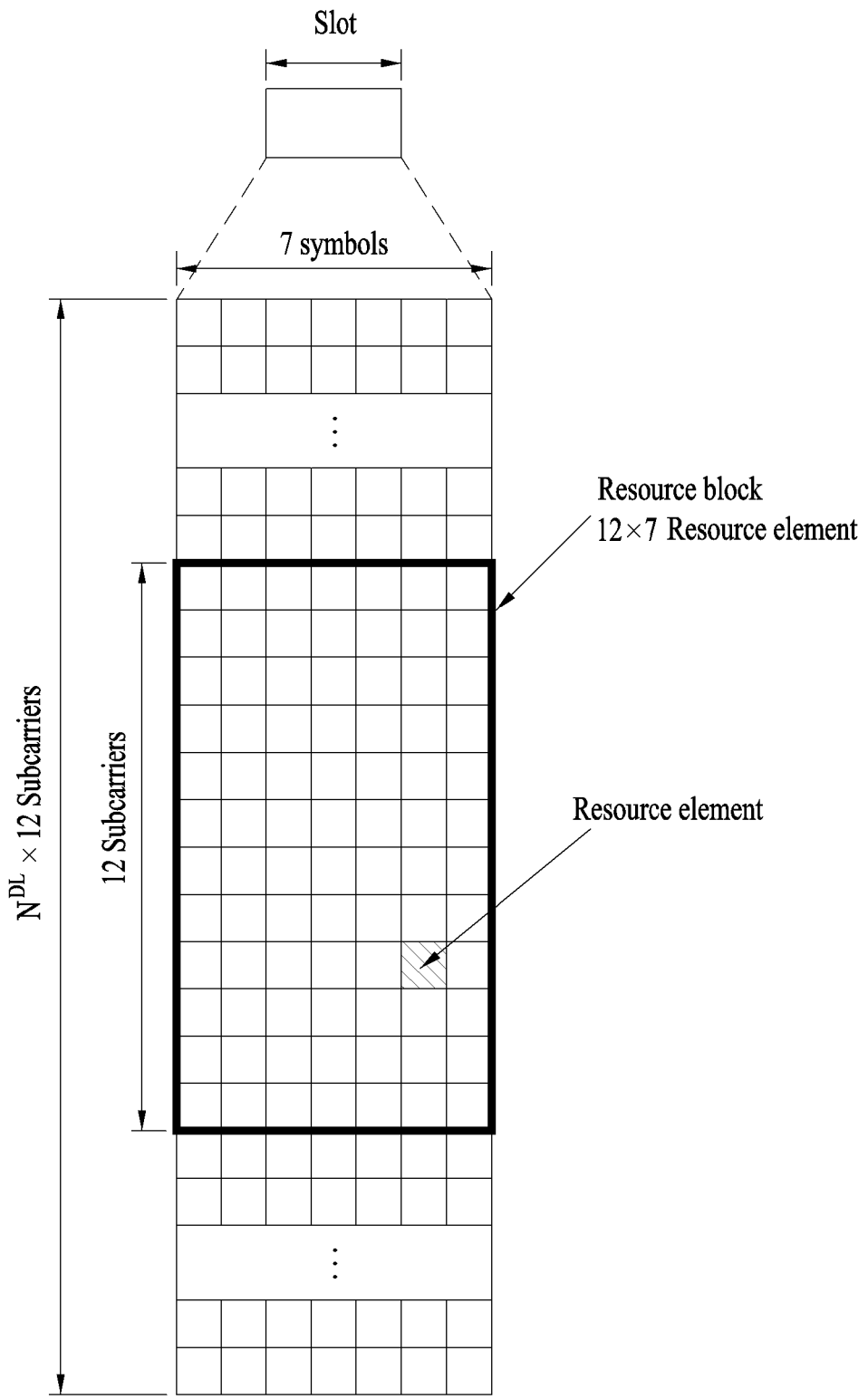
FIG. 3 illustrates a structure of a DownLink (DL) resource grid for the duration of one DL slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
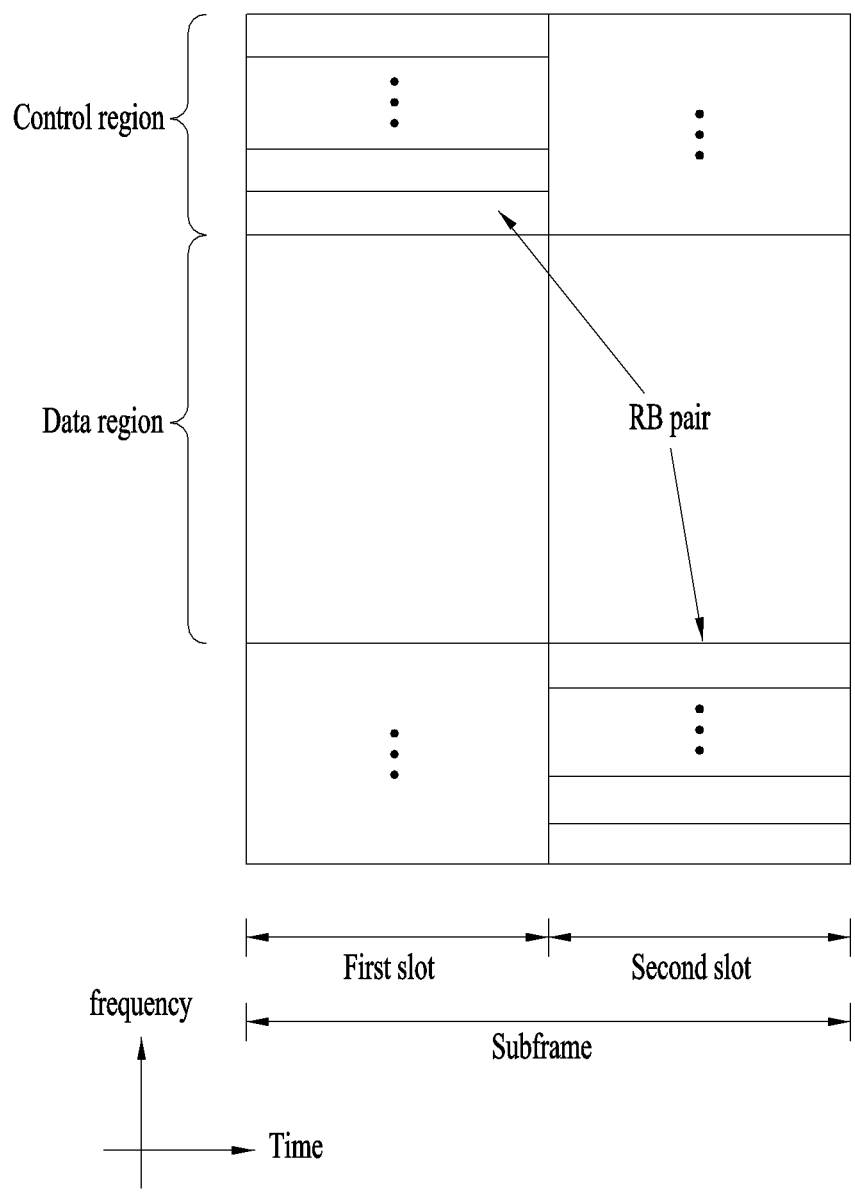
FIG. 4 illustrates a structure of an UpLink (UL) subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
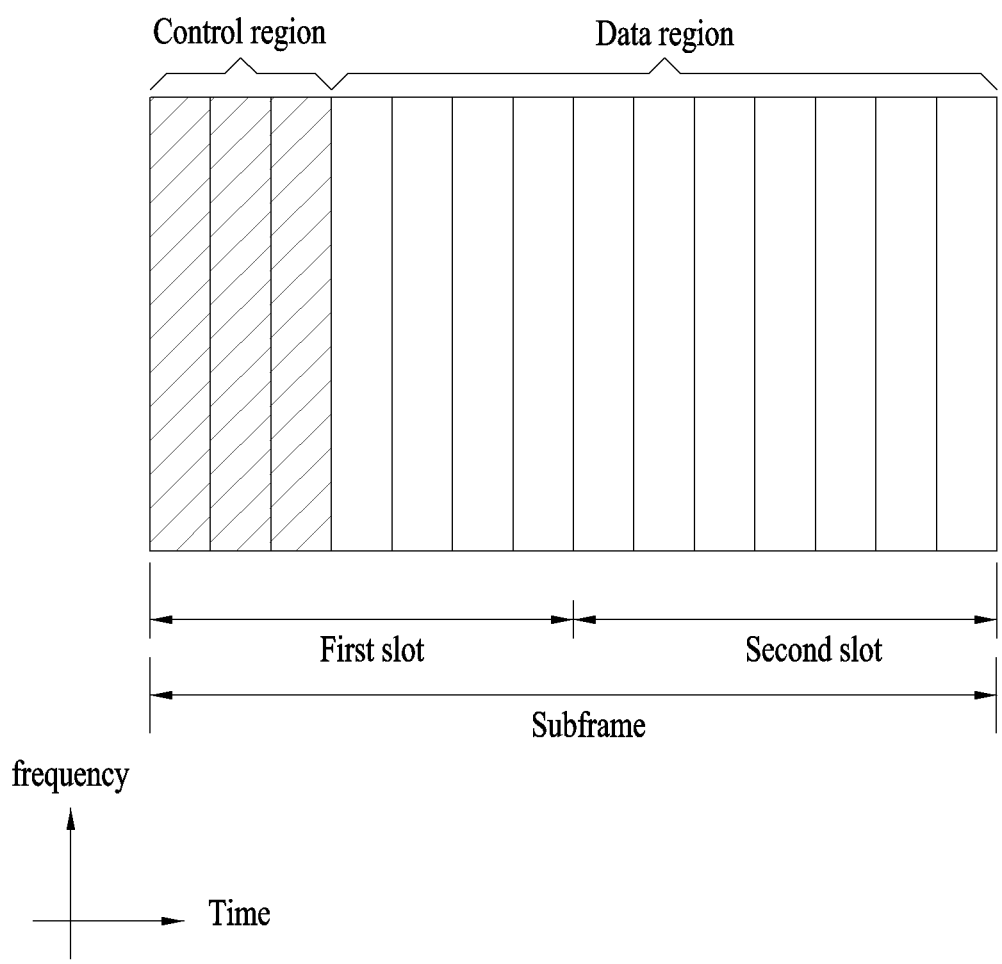
FIG. 5 illustrates a structure of a DL subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

1.2 Carrier Aggregation (CA) Environment 1.2.1 CA Overview

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present invention, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present invention may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguraiton message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present invention.

1.2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set is preferably defined within the UE DL CC set. That is, the eNB transmits a PDCCH only in the PDCCH monitoring set to schedule a PDSCH or PUSCH for the UE.

Figure 6:
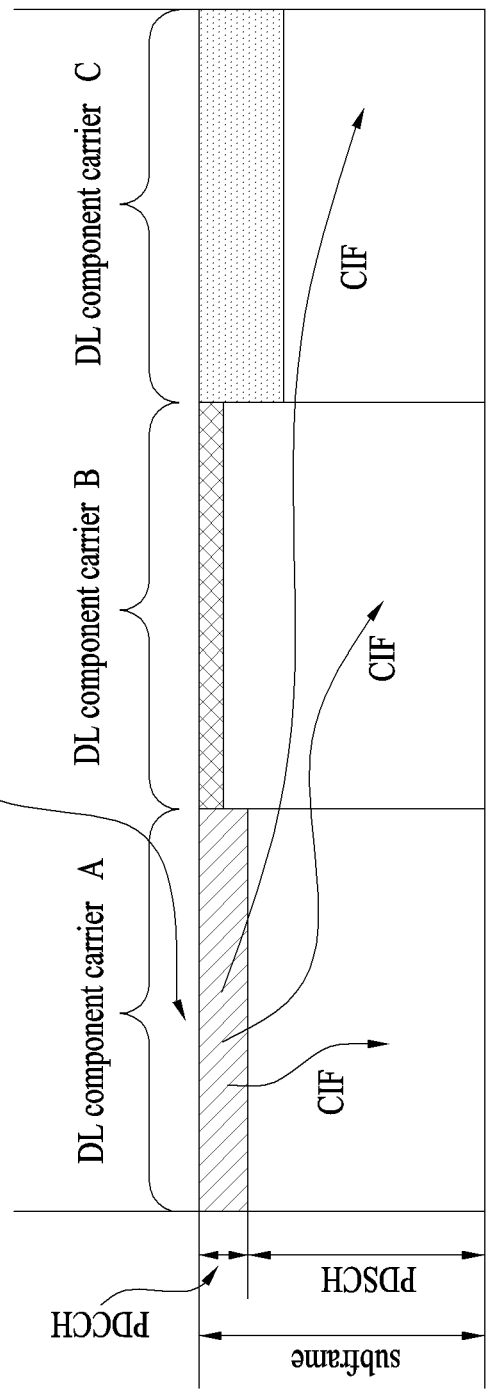
FIG. 6 illustrates a cross carrier-scheduled subframe structure in the LTE-A system.

FIG. 6 illustrates a cross carrier-scheduled subframe structure in the LTE-A system, which is used in embodiments of the present invention.

Referring to FIG. 6, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

1.3 Physical Downlink Control Channel (PDCCH)

1.3.1 PDCCH Overview

The PDCCH may deliver information about resource allocation and a transport format for a Downlink Shared Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in an aggregate of one or more consecutive Control Channel Elements (CCEs). A PDCCH made up of one or more consecutive CCEs may be transmitted in the control region after subblock interleaving. A CCE is a logical allocation unit used to provide a PDCCH at a code rate based on the state of a radio channel. A CCE includes a plurality of RE Groups (REGs). The format of a PDCCH and the number of available bits for the PDCCH are determined according to the relationship between the number of CCEs and a code rate provided by the CCEs.

1.3.2 PDCCH Structure

A plurality of PDCCHs for a plurality of UEs may be multiplexed and transmitted in the control region. A PDCCH is made up of an aggregate of one or more consecutive CCEs. A CCE is a unit of 9 REGs each REG including 4 REs. Four Quadrature Phase Shift Keying (QPSK) symbols are mapped to each REG. REs occupied by RSs are excluded from REGs. That is, the total number of REGs in an OFDM symbol may be changed depending on the presence or absence of a cell-specific RS. The concept of an REG to which four REs are mapped is also applicable to other DL control channels (e.g. the PCFICH or the PHICH). Let the number of REGs that are not allocated to the PCFICH or the PHICH be denoted by $N_{REG}$. Then the number of CCEs available to the system is $N_{CCE}$ ($=\lfloor N_{REG}/9 \rfloor$) and the CCEs are indexed from 0 to NCCE-1.

To simplify the decoding process of a UE, a PDCCH format including n CCEs may start with a CCE having an index equal to a multiple of n. That is, given CCE i, the PDCCH format may start with a CCE satisfying i mod n=0.

The eNB may configure a PDCCH with 1, 2, 4, or 8 CCEs. {1, 2, 4, 8} are called CCE aggregation levels. The number of CCEs used for transmission of a PDCCH is determined according to a channel state by the eNB. For example, one CCE is sufficient for a PDCCH directed to a UE in a good DL channel state (a UE near to the eNB). On the other hand, 8 CCEs may be required for a PDCCH directed to a UE in a poor DL channel state (a UE at a cell edge) in order to ensure sufficient robustness.

[Table 2] below illustrates PDCCH formats. 4 PDCCH formats are supported according to CCE aggregation levels as illustrated in [Table 2].

TABLE 2

| PDCCH format | Number of CCEs (n) | Number of REGs | Number of PDCCH bits |
| --- | --- | --- | --- |
| 0 | 1 | 9 | 72 |
| 1 | 2 | 18 | 144 |
| 2 | 4 | 36 | 288 |
| 3 | 8 | 72 | 576 |

A different CCE aggregation level is allocated to each UE because the format or Modulation and Coding Scheme (MCS) level of control information delivered in a PDCCH for the UE is different. An MCS level defines a code rate used for data coding and a modulation order. An adaptive MCS level is used for link adaptation. In general, three or four MCS levels may be considered for control channels carrying control information.

Regarding the formats of control information, control information transmitted on a PDCCH is called DCI. The configuration of information in PDCCH payload may be changed depending on the DCI format. The PDCCH payload is information bits. [Table 3] lists DCI according to DCI formats.

TABLE 3

| DCI Format | Description |
| --- | --- |
| Format 0 | Resource grants for the PUSCH transmissions (uplink) |
| Format 1 | Resource assignments for single codeword PDSCH transmissions (transmission modes 1, 2 and 7) |
| Format 1A | Compact signaling of resource assignments for single codeword PDSCH (all modes) |
| Format 1B | Compact resource assignments for PDSCH using rank-1 closed loop precoding (mode 6) |
| Format 1C | Very compact resource assignments for PDSCH (e.g. paging/broadcast system information) |
| Format 1D | Compact resource assignments for PDSCH using multi-user MIMO (mode 5) |
| Format 2 | Resource assignments for PDSCH for closed-loop MIMO operation (mode 4) |

TABLE 3-continued

| DCI Format | Description |
| --- | --- |
| Format 2A | Resource assignments for PDSCH for open-loop MIMO operation (mode 3) |
| Format 3/3A | Power control commands for PUCCH and PUSCH with 2-bit/1-bit power adjustment |
| Format 4 | Scheduling of PUSCH in one UL cell with multi-antenna port transmission mode |

Referring to [Table 3], the DCI formats include Format 0 for PUSCH scheduling, Format 1 for single-codeword PDSCH scheduling, Format 1A for compact single-codeword PDSCH scheduling, Format 1C for very compact DL-SCH scheduling, Format 2 for PDSCH scheduling in a closed-loop spatial multiplexing mode, Format 2A for PDSCH scheduling in an open-loop spatial multiplexing mode, and Format 3/3A for transmission of Transmission Power Control (TPC) commands for uplink channels. DCI Format 1A is available for PDSCH scheduling irrespective of the transmission mode of a UE.

The length of PDCCH payload may vary with DCI formats. In addition, the type and length of PDCCH payload may be changed depending on compact or non-compact scheduling or the transmission mode of a UE.

The transmission mode of a UE may be configured for DL data reception on a PDSCH at the UE. For example, DL data carried on a PDSCH includes scheduled data, a paging message, a random access response, broadcast information on a BCCH, etc. for a UE. The DL data of the PDSCH is related to a DCI format signaled through a PDCCH. The transmission mode may be configured semi-statically for the UE by higher-layer signaling (e.g. Radio Resource Control (RRC) signaling). The transmission mode may be classified as single antenna transmission or multi-antenna transmission.

A transmission mode is configured for a UE semi-statically by higher-layer signaling. For example, multi-antenna transmission scheme may include transmit diversity, open-loop or closed-loop spatial multiplexing, Multi-User Multiple Input Multiple Output (MU-MIMO), or beamforming. Transmit diversity increases transmission reliability by transmitting the same data through multiple Tx antennas. Spatial multiplexing enables high-speed data transmission without increasing a system bandwidth by simultaneously transmitting different data through multiple Tx antennas. Beamforming is a technique of increasing the Signal to Interference plus Noise Ratio (SINR) of a signal by weighting multiple antennas according to channel states.

A DCI format for a UE depends on the transmission mode of the UE. The UE has a reference DCI format monitored according to the transmission mode configure for the UE. The following 10 transmission modes are available to UEs:

Transmission mode 1: Single antenna transmission
Transmission mode 2: Transmission diversity
Transmission mode 3: Open-loop codebook based precoding when the number of layer is greater than 1, Transmission diversity when the number of rank is 1
Transmission mode 4: closed-loop codebook based precoding
Transmission mode 5: Multi-user MIMO of transmission mode 4 version
Transmission mode 6: closed-loop codebook based precoding which is specifically limited for signal layer transmission
Transmission mode 7: precoding dose not based on codebooks only supporting single layer transmission (release 8)
Transmission mode 8: precoding dose not based on codebooks supporting maximum 2 layers (release 9)
Transmission mode 9: precoding dose not based on codebooks supporting maximum 8 layers (release 10)
Transmission mode 10: precoding dose not based on codebooks supporting maximum 8 layers, for CoMP use (release 11)

1.3.3 PDCCH Transmission

The eNB determines a PDCCH format according to DCI that will be transmitted to the UE and adds a Cyclic Redundancy Check (CRC) to the control information. The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

Then the eNB generates coded data by channel-encoding the CRC-added control information. The channel coding may be performed at a code rate corresponding to an MCS level. The eNB rate-matches the coded data according to a CCE aggregation level allocated to a PDCCH format and generates modulation symbols by modulating the coded data. Herein, a modulation order corresponding to the MCS level may be used for the modulation. The CCE aggregation level for the modulation symbols of a PDCCH may be one of 1, 2, 4, and 8. Subsequently, the eNB maps the modulation symbols to physical REs (i.e. CCE to RE mapping).

1.4 Reference Signal (RS)

Hereinafter, reference signals are explained, which are used for the embodiments of the present invention.

Figure 7:
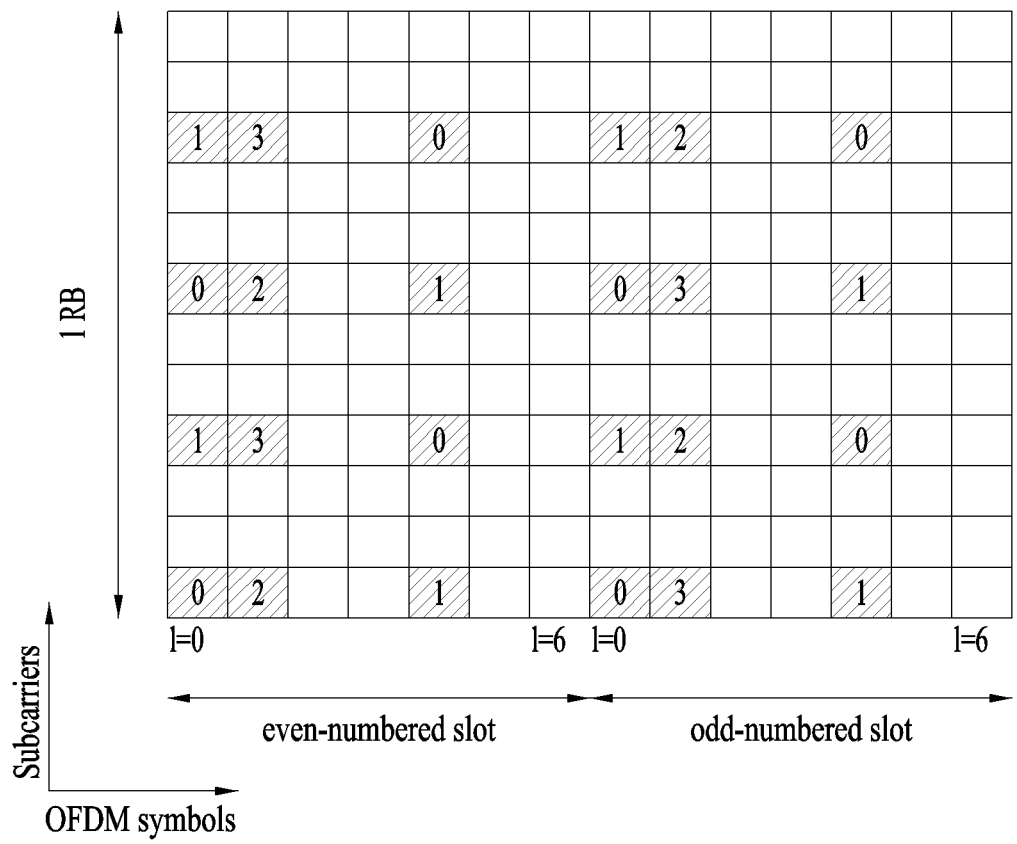
FIG. 7 illustrates a subframe to which cell specific reference signals (CRSs) are allocated.

FIG. 7 illustrates a subframe to which cell specific reference signals (CRSs) are allocated, which may be used in embodiments of the present disclosure.

FIG. 7 represents an allocation structure of the CRS in case of the system supporting 4 antennas. Since CRSs are used for both demodulation and measurement, the CRSs are transmitted in all DL subframes in a cell supporting PDSCH transmission and are transmitted through all antenna ports configured at an eNB.

More specifically, CRS sequence is mapped to complex-modulation symbols used as reference symbols for antenna port p in slot $n_s$.

A UE may measure CSI using the CRSs and demodulate a signal received on a PDSCH in a subframe including the CRSs. That is, the eNB transmits the CRSs at predetermined locations in each RB of all RBs and the UE performs channel estimation based on the CRSs and detects the PDSCH. For example, the UE may measure a signal received on a CRS RE and detect a PDSCH signal from an RE to which the PDSCH is mapped using the measured signal and using the ratio of reception energy per CRS RE to reception energy per PDSCH mapped RE.

When the PDSCH is transmitted based on the CRSs, since the eNB should transmit the CRSs in all RBs, unnecessary RS overhead occurs. To solve such a problem, in a 3GPP LTE-A system, a UE-specific RS (hereinafter, UE-RS) and a CSI-RS are further defined in addition to a CRS. The UE-RS is used for demodulation and the CSI-RS is used to derive CSI. The UE-RS is one type of a DRS.

Since the UE-RS and the CRS may be used for demodulation, the UE-RS and the CRS can be regarded as demodulation RSs in terms of usage. Since the CSI-RS and the CRS are used for channel measurement or channel estimation, the CSI-RS and the CRS can be regarded as measurement RSs.

Figure 8:
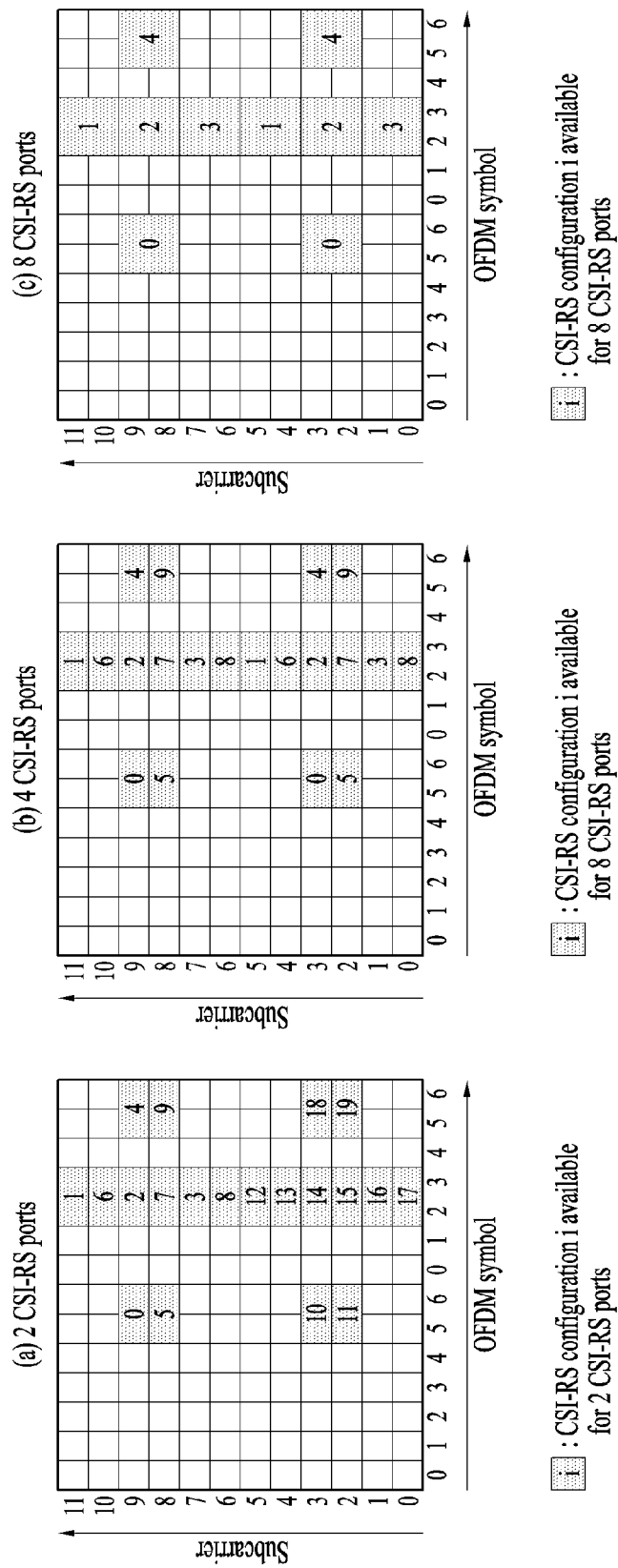
FIG. 8 illustrates an example of subframes to which channel state information reference signals (CSI-RSs) are allocated according to the number of antenna ports.

FIG. 8 illustrates channel state information reference signal (CSI-RS) configurations allocated according to the number of antenna ports, which may be used in embodiments of the present disclosure.

A CSI-RS is a DL RS that is introduced in a 3GPP LTE-A system for channel measurement rather than for demodulation. In the 3GPP LTE-A system, a plurality of CSI-RS configurations is defined for CSI-RS transmission. In subframes in which CSI-RS transmission is configured, CSI-RS sequence is mapped to complex modulation symbols used as RSs on antenna port p.

FIG. 8(a) illustrates 20 CSI-RS configurations 0 to 19 available for CSI-RS transmission through two CSI-RS ports among the CSI-RS configurations, FIG. 8(b) illustrates 10 available CSI-RS configurations 0 to 9 through four CSI-RS ports among the CSI-RS configurations, and FIG. 8(c) illustrates 5 available CSI-RS configurations 0 to 4 through 8 CSI-RS ports among the CSI-RS configurations.

The CSI-RS ports refer to antenna ports configured for CSI-RS transmission. Since CSI-RS configuration differs according to the number of CSI-RS ports, if the numbers of antenna ports configured for CSI-RS transmission differ, the same CSI-RS configuration number may correspond to different CSI-RS configurations.

Unlike a CRS configured to be transmitted in every subframe, a CSI-RS is configured to be transmitted at a prescribed period corresponding to a plurality of subframes. Accordingly, CSI-RS configurations vary not only with the locations of REs occupied by CSI-RSs in an RB pair according to Table 6 or Table 7 but also with subframes in which CSI-RSs are configured.

Meanwhile, if subframes for CSI-RS transmission differ even when CSI-RS configuration numbers are the same, CSI-RS configurations also differ. For example, if CSI-RS transmission periods ($T_{CSI-RS}$) differ or if start subframes ($\Delta_{CSI-RS}$) in which CSI-RS transmission is configured in one radio frame differ, this may be considered as different CSI-RS configurations.

Hereinafter, in order to distinguish between a CSI-RS configuration to which (1) a CSI-RS configuration is assigned and (2) a CSI-RS configuration varying according to a CSI-RS configuration number, the number of CSI-RS ports, and/or a CSI-RS configured subframe, the CSI-RS configuration of the latter will be referred to as a CSI-RS resource configuration. The CSI-RS configuration of the former will be referred to as a CSI-RS configuration or CSI-RS pattern.

Upon informing a UE of the CSI-RS resource configuration, an eNB may inform the UE of information about the number of antenna ports used for transmission of CSI-RSs, a CSI-RS pattern, CSI-RS subframe configuration $I_{CSI-RS}$, UE assumption on reference PDSCH transmitted power for CSI feedback $P_c$, a zero-power CSI-RS configuration list, a zero-power CSI-RS subframe configuration, etc.

CSI-RS subframe configuration $I_{CSI-RS}$ is information for specifying subframe configuration periodicity $T_{CSI-RS}$ and subframe offset $\Delta_{CSI-RS}$ regarding occurrence of the CSI-RSs. The following table 8 shows CSI-RS subframe configuration $I_{CSI-RS}$ according to $T_{CSI-RS}$ and $\Delta_{CSI-RS}$.

TABLE 8

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

Subframes satisfying the following Equation 1 are subframes including CSI-RSs.

$(10n_f + \lfloor n_s/2 \rfloor - \Delta_{CSI-RS}) \bmod T_{CSI-RS} = 0$ [Equation 1]

A UE configured as transmission modes defined after introduction of the 3GPP LTE-A system (e.g. transmission mode 9 or other newly defined transmission modes) may perform channel measurement using a CSI-RS and decode a PDSCH using a UE-RS.

Figure 9:
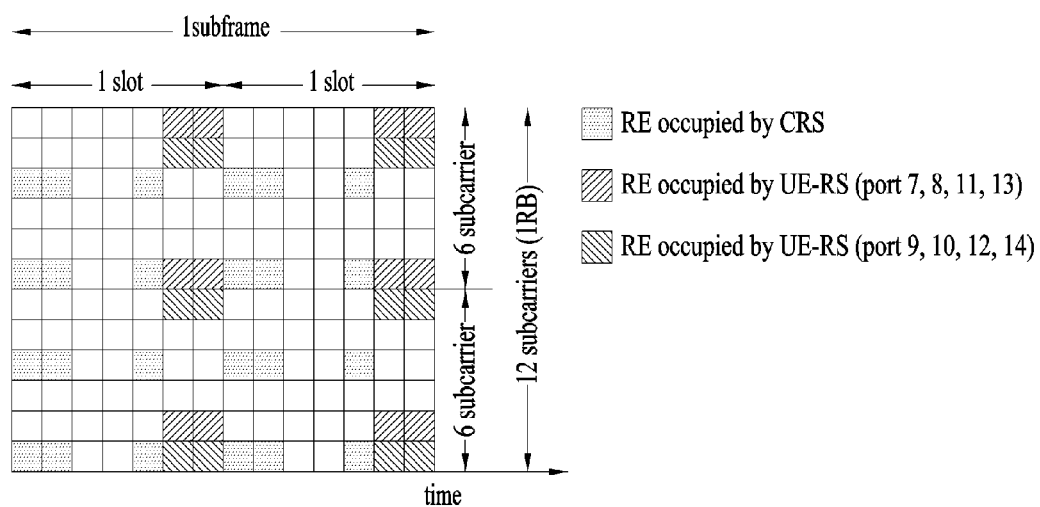
FIG. 9 illustrates an example of a subframe to which UE-specific Reference Signals (UE-RSs) are allocated.

FIG. 9 illustrates an example of a subframe to which UE-RSs are allocated, which may be used in embodiments of the present disclosure.

Referring to FIG. 9, the subframe illustrates REs occupied by UE-RSs among REs in one RB of a normal DL subframe having a normal CP.

UE-RSs are transmitted on antenna port(s) p=5, p=7, p=8 or p=7, 8, . . . , ν+6 for PDSCH transmission, where u is the number of layers used for the PDSCH transmission. UE-RSs are present and are a valid reference for PDSCH demodulation only if the PDSCH transmission is associated with the corresponding antenna port. UE-RSs are transmitted only on RBs to which the corresponding PDSCH is mapped.

The UE-RSs are configured to be transmitted only on RB(s) to which a PDSCH is mapped in a subframe in which the PDSCH is scheduled unlike CRSs configured to be transmitted in every subframe irrespective of whether the PDSCH is present. Accordingly, overhead of the RS may decrease relative to overhead of the CRS.

In the 3GPP LTE-A system, the UE-RSs are defined in a PRB pair. Referring to FIG. 9, in a PRB having frequency-domain index nPRB assigned for PDSCH transmission with respect to p=7, p=8, or p=7, 8, . . . , ν+6, a part of UE-RS sequence r(m) is mapped to complex-valued modulation symbols $a_{k,l}^{(p)}$ in a subframe according to the following equation 10.

UE-RSs are transmitted through antenna port(s) corresponding respectively to layer(s) of a PDSCH. That is, the number of UE-RS ports is proportional to a transmission rank of the PDSCH. Meanwhile, if the number of layers is 1 or 2, 12 REs per RB pair are used for UE-RS transmission and, if the number of layers is greater than 2, 24 REs per RB pair are used for UE-RS transmission. In addition, locations of REs occupied by UE-RSs (i.e. locations of UE-RS REs) in a RB pair are the same with respect to a UE-RS port regardless of a UE or a cell.

As a result, the number of DMRS REs in an RB to which a PDSCH for a specific UE in a specific subframe is mapped is the same. Notably, in RBs to which the PDSCH for different UEs in the same subframe is allocated, the number of DMRS REs included in the RBs may differ according to the number of transmitted layers.

1.5 Synchronization Signal

A Synchronization Signal (SS) is categorized into a Primary Synchronization Signal (PSS) and a Secondary Synchronization Signal (SSS). The SS is a signal used for synchronization acquisition and cell search between a UE and an eNB.

Figure 10:
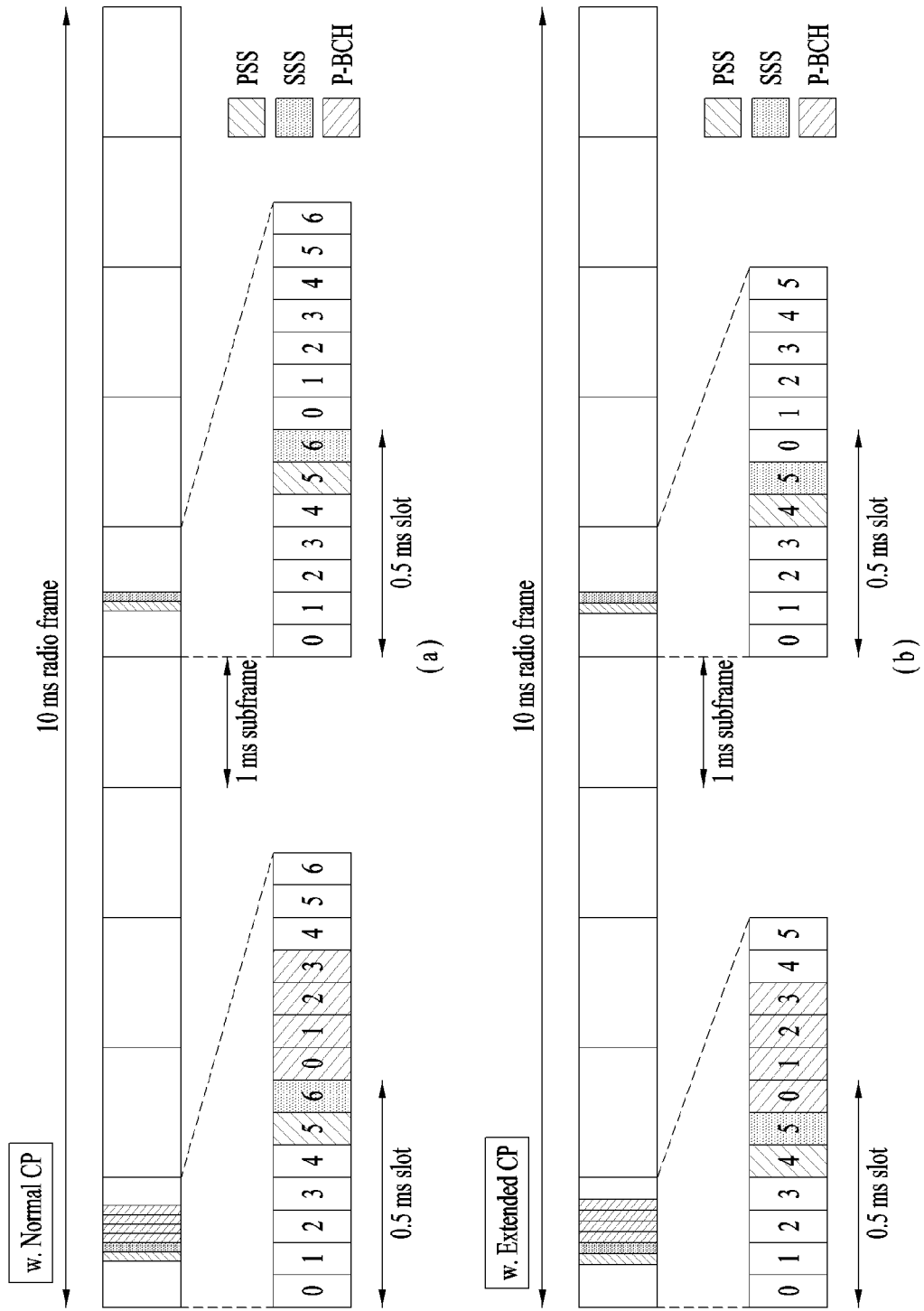
FIG. 10 illustrates an example of a frame structure in which synchronization signal transmission positions are indicated.

FIG. 10 illustrates an example of a frame structure in which SS transmission positions are indicated. Particularly, FIG. 10(a) and FIG. 10(b) illustrate frame structures for SS transmission in systems using a normal Cyclic Prefix (CP) and an extended CP, respectively.

An SS is transmitted in the second slot of subframe number 0 and the second slot of subframe number 5, in consideration of a GSM frame length of 4.6 ms for facilitation of inter-Radio Access Technology (RAT) measurement. A boundary of the corresponding radio frame may be detected through an SSS.

Referring to FIG. 10(a) and FIG. 10(b), a PSS is transmitted on the last OFDM symbols of slot numbers 0 and 5 and an SSS is transmitted on an OFDM symbol immediately before the PSS. The SS may transmit a total of 504 physical cell IDs by a combination of 3 PSSs and 168 SSSs. In addition, the SS and a PBCH are transmitted within middle 6 RBs of a system bandwidth so that the UE may detect or decode the SS and PBCH irrespective of the size of a transmission bandwidth.

A transmit diversity scheme of the SS uses only a single antenna port. That is, a single antenna transmission scheme or a UE transparent transmission scheme (e.g. Precoding Vector Switching (PVS), Time Switched Transmit Diversity (TSTD), or Cyclic Delay Diversity (CDD)) may be used.

1.5.1 Primary Synchronization Signal (PSS)

A length-63 Zadoff-Chu (ZC) sequence is defined in the frequency domain and is used as a sequence of the PSS. The ZC sequence is defined by Equation 2.

$$d_u(n) = e^{-j\frac{\pi u n(n+1)}{N_{ZC}}}$$ [Equation 2]

In Equation 2, Nzc represents length-63 of the ZC sequence and du(n) represents a PSS sequence according to a root index u. A sequence element corresponding to a Direct Current (DC) subcarrier, n=31, is punctured.

Among middle 6 RBs (=72 subcarriers) of bandwidth, 9 remaining subcarriers carry a value of always 0 to facilitate filter design for performing synchronization. To define a total of three PSSs, values of u=25, 29, and 34 may be used in Equation 2. In this case, since u=29 and u=34 have a conjugate symmetry relation, two correlations may be simultaneously performed. Here, conjugate symmetry indicates the relationship of the following Equation 3. A one-shot correlator for u=29 and u=34 may be implemented using the characteristics of conjugate symmetry so that the entire amount of calculation can be reduced by about 33.3%.

$$d_u(n)=(-1)^n(d_{N_{ZC}-u}(n))^*, \text{ when } N_{ZC} \text{ is even number.}$$

$$d_u(n)=(d_{N_{ZC}-u}(n))^*, \text{ when } N_{ZC} \text{ is odd number.}$$ [Equation 3]

1.5.2 Secondary Synchronization Signal (SSS)

An SSS is generated by interleaving and concatenating two m-sequences of length-31. In this case, 168 cell group IDs may be identified by combining the two sequences. As the sequence of the SSS, the m-sequences are robust in a frequency selective environment and can reduce the amount of calculation by high-speed m-sequence transform using fast Hadamard transform. In addition, configuration of the SSS using two short codes has been proposed to reduce the amount of calculation by a UE.

Figure 11:
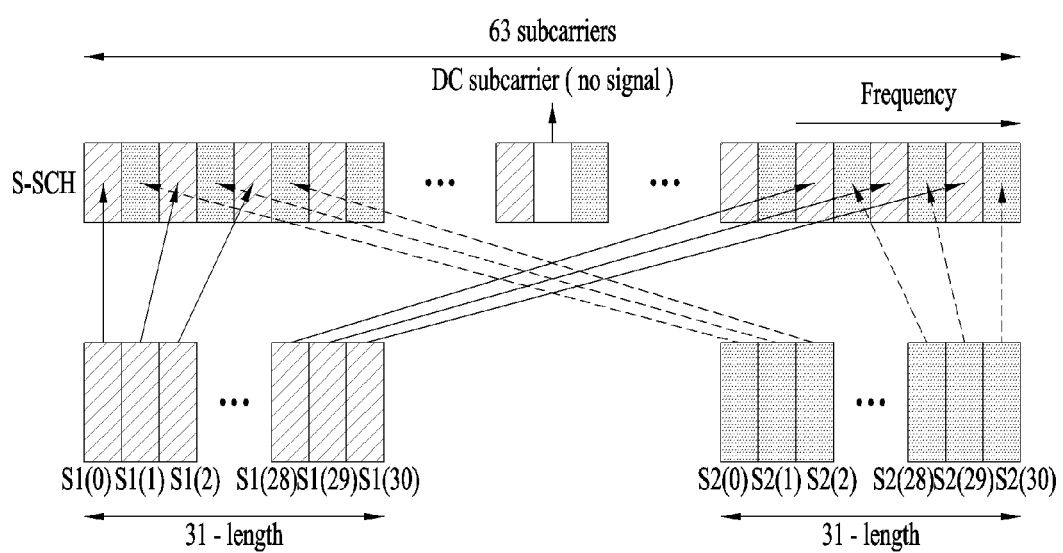
FIG. 11 illustrates a secondary synchronization signal generation method.

FIG. 11 illustrates an SSS generation method.

Referring to FIG. 11, it may be appreciated that two m-sequences defined in a logical region are interleaved and mapped in a physical region. For example, if two m-sequences used to generate an SSS code are defined as S1 and S2, when the SSS of subframe index 0 transmits a cell group ID by a combination of the two sequences of (S1, S2), the SSS of subframe index 5 transmits the cell group ID by swapping the sequences for (S2, S1), so that a boundary of a 10 ms frame can be distinguished. The SSS code used in this case is generated using a polynomial of $x^5+x^2+1$ and a total of 31 codes may be generated through different circular shifts.

To improve reception performance, two different PSS based sequences are defined and are scrambled to the SSS. Here, the PSS based sequences are scrambled to S1 and S2 as different sequences. Next, an S1 based scrambling code is defined and is scrambled to S2. In this case, SSS codes are swapped in units of 5 ms but PSS based scrambling codes are not swapped. The PSS based scrambling code is defined as 6 cyclic shift versions according to a PSS index in an m-sequence generated from a polynomial of $x^5+x^3+1$ and the S1 based scrambling code is defined as 8 cyclic shift versions according to an S1 index in an m-sequence generated from a polynomial of $x^5+x^4+x^2+x^1+1$.

2. PQI and QCL used in NCT 2.1 New Carrier Type (NCT)

In LTE Release 8/9/10/11 systems which are legacy systems, RSs and control channels such as a CRS, a Primary Synchronization Signal (PSS), a Secondary Synchronization Signal (SSS), a PDCCH, and a PBCH are transmitted in a DL CC.

However, in a future wireless access system, a DL CC in which all or some of the CRS, the PSS/SSS, the PDCCH, and the PBCH are not transmitted may be introduced in order to overcome an interference problem between a plurality of cells and to improve carrier extension. In the embodiments of the present disclosure, this carrier is defined as an extension carrier or a New Carrier Type (NCT), for convenience.

The NCT described in the present disclosure may be an SCell in the case in which an eNB supports CA or may be a carrier or a serving cell provided by a neighboring eNB for cooperative data transmission in the case in which eNBs support CoMP. In addition, the NCT may be a small cell which is a cell synchronized with a reference cell (e.g. PCell).

2.2 Quasi Co-Location (QCL)

Hereinafter, QCL between antenna ports will be described.

If antenna ports are Quasi-Co-Located (also called QCL), this means that "a UE may assume that large-scale properties of a signal received from one antenna port (or a radio channel corresponding to one antenna port) are equal in entirety or in part to large-scale properties of a signal received from another antenna port (or a radio channel corresponding to another antenna port)". The large-scale properties may include Doppler spread related to a frequency offset, Doppler shift, an average delay related to a timing offset, and a delay spread and may further include an average gain.

According to definition of QCL, the UE cannot assume that the large-scale properties of antenna ports not in a QCL relationship, i.e. large-scale properties of Non Quasi Co-Located (NQCL) antenna ports are equal. In this case, the UE should independently perform a tracking procedure to obtain the frequency offset, the timing offset, etc. according to an antenna port.

In contrast, the UE may advantageously perform following operations between QCL antenna ports.

1) The UE may identically apply a power-delay profile, delay spread, a Doppler spectrum, and Doppler spread estimation result, for a radio channel corresponding to a specific antenna port, to Wiener filter parameters, etc. which are used to estimate a radio channel corresponding to another antenna port.

2) The UE may acquire time synchronization and frequency synchronization for the specific antenna port and then apply the same synchronization to another antenna port.

3) The UE may calculate a Reference Signal Received Power (RSRP) measurement value of each QCL antenna port as an average with respect to average gain.

For example, when the UE receives scheduling information (e.g. DCI format 2C) about a DeModulation Reference Signal (DM-RS) based DL data channel via a PDCCH (or an E-PDCCH), it is assumed that the UE performs channel estimation for a PDSCH via a DM-RS sequence indicated by the scheduling information and then performs data demodulation.

In this case, if a DM-RS antenna port for DL data channel demodulation is QCL with a CRS antenna port of a serving cell, the UE may applying large-scale properties of a radio channel estimated from a CRS antenna port thereof without change upon channel estimation via the DM-RS antenna port, thereby improving reception performance of the DM-RS based DL data channel.

Similarly, if a DM-RS antenna port used for DL data channel demodulation is QCL with a CSI-RS antenna port of a serving cell, the UE may apply large-scale properties of a radio channel estimated from the CSI-RS antenna port of the serving cell without change upon channel estimation via the DM-RS antenna port, thereby improving reception performance of the DM-RS based DL data channel.

Meanwhile, an LTE system defines that an eNB sets one of QCL type A and QCL type B with respect to a UE via a higher layer signal upon transmitting a DL signal in transmission mode 10, which is a CoMP mode.

In QCL type A, it is assumed that antenna ports of a CRS, a DM-RS, and a CSI-RS are QCL with respect to large-scale properties except for average gain and the same node transmits physical channels and signals.

In contrast, in QCL type B, up to four QCL modes for each UE are set via a higher layer message so as to perform CoMP transmission such as Dynamic Point Selection (DPS) or Joint Transmission (JT) and a QCL mode to be used for DL signal reception among the four QCL modes is defined to be dynamically set through a PQI field of DCI.

DPS transmission in the case of QCL type B will now be described in more detail.

First, it is assumed that node #1 composed of N1 antenna ports transmits CSI-RS resource #1 and node #2 composed of N2 antenna ports transmits CSI-RS resource #2. In this case, CSI-RS resource #1 is included in QCL mode parameter set #1 and CSI-RS resource #2 is included in QCL mode parameter set #2. The eNB sets parameter set #1 and parameter set #2 via a higher layer signal with respect to a UE located within common coverage of node #1 and node #2.

Next, the eNB may perform DPS by setting parameter set #1 using DCI upon data (i.e. PDSCH) transmission to the UE via node #1 and setting parameter set #2 upon data transmission to the UE via node #2. If the UE may assume that CSI-RS resource #1 and a DM-RS are QCL upon receiving parameter set #1 via the DCI and that CSI-RS resource #2 and the DM-RS are QCL upon receiving parameter set #2.

2.2.1 DCI Format 2D

DCI format 2D has been newly defined to support DL transmission in an LTE-A Rel-11 system. In particular, DCI format 2D is defined to support CoMP between eNBs and is associated with transmission mode 10. That is, in order for a UE configured as transmission mode 10 for an allocated serving cell to decode a PDSCH according to a detected PDCCH/EPDCCH signal with DCI format 2D, up to 4 parameter sets may be configured through higher layer signaling. For a detailed description of each field included in DCI format 2D, reference may be made to section 5.3.3.1.5D of 3GPP TS 36.212 v11.3.

Table 5 shown below shows an exemplary PDSCH RE Mapping and Quasi-Co-Location Indicator (PQI) field included in DCI format 2D.

TABLE 5

| Value of 'PDSCH RE Mapping and Quasi-Co-Location Indicator' field | Description |
| --- | --- |
| '00' | Parameter set 1 configured by higher layers |
| '01' | Parameter set 2 configured by higher layers |
| '10' | Parameter set 3 configured by higher layers |
| '11' | Parameter set 4 configured by higher layers |

Parameters shown in the following Table 6 are used to determine PDSCH RE mapping and PDSCH antenna port QCL. In Table 5, the PQI field indicates each parameter set configured via higher layer signaling.

TABLE 6

| Parameter | Description |
| --- | --- |
| crs-PortsCount-r11 | Number of CRS antenna ports for DPSCH RE mapping |
| crs-FreqShift-r11 | CRS frequency shift for PDSCH RE mapping |
| mbsfn-SubframeConfigList-r11 | MBSFN subframe configuration for PDSCH RE mapping |
| csi-RS-ConfigZPId-r11 | Zero-power CSI-RS resource configuration for PDSCH RE mapping |
| pdsch-Start-r11 | PDSCH starting position for PDSCH RE mapping |
| qcl-CSI-RS-ConfigNZPId-r11 | CSI-RS resource configuration identity for Quasi-Co-Location |

Referring to Table 6, parameter 'crs-PortsCount-r11' represents the number of CRS antenna ports for PDSCH RE mapping, parameter 'crs-FreqShift-r11' represents a CRS frequency shift value for PDSCH RE mapping, and parameter 'mbsfn-SubframeConfigList-r11' represents a Multimedia Broadcast over Single Frequency Network (MBSFN) subframe configuration for PDSCH RE mapping. In addition, parameter 'csi-RS-ConfigZPId-r11' represents a zero-power CSI-RS resource configuration for PDSCH RE mapping, parameter 'pdsch-Start-r11' represents a PDSCH start position for PDSCH RE mapping, and parameter 'qcl-CSI-RS-ConfigNZPId-r11' is used to identify a CSI-RS resource configuration for QCL.

In Table 5, parameter sets 1, 2, 3, and 4 are composed of a combination of the parameters shown in Table 6. Information about the combination of the parameters included in each parameter set is signaled to the UE by a higher layer.

2.3 Definition of New PQI Used in NCT

A legacy system supports transmission of a CRS, a PDCCH, etc., whereas a next system introduces an NCT in which transmission of the CRS, the PDCCH, etc. is not supported to raise data transmission efficiency. In the NCT, a new RS which is mapped to an RE corresponding to an antenna port of the CRS used in the legacy system but is not used for demodulation is defined. For example, since the new RS is used only for time/frequency tracking (i.e. time/frequency synchronization acquisition), the new RS will be referred to as a Tracking Reference Signal (TRS) in the embodiments of the present disclosure.

The TRS may be periodically transmitted in the NCT (e.g. at an interval of 5 ms). In an LTE Rel-11 system, Transmission Mode (TM) 10 is defined to support a CoMP operation. In this case, PQI information is included in DCI format 2D for PDSCH rate matching. The PQI information indicates 4 states using two bits (refer to section 1.4) and each state represents a combination of information configured by a higher layer.

In the NCT, not the CRS but the TRS is periodically transmitted on an RE corresponding to an antenna port of the CRS. Accordingly, the embodiments of the present disclosure provide a method for newly configuring and interpreting the PQI information used in the NCT. Particularly, the PQI information may be reconfigured as an abbreviated type suitable for the NCT.

3. Radio Resource Measurement (RRM)

When CA is supported in a wireless access system, each carrier (i.e. serving cell) may schedule a PDSCH/PUSCH through a PDCCH using a self-scheduling scheme. Alternatively, each carrier may schedule a PDSCH/PUSCH of another serving cell through a PDCCH transmitted in any one serving cell using cross carrier scheduling (refer to section 1.2). In the embodiments of the disclosure, the term carrier used in CA has the same meaning as serving cell.

In order to add any serving cell to CA as a secondary carrier or a secondary serving cell, a UE needs to perform neighbor cell measurement. Generally, neighbor cell measurement is performed using a CRS and may also be called RRM.

Carriers (i.e. serving cells) included in a CA set are divided into synchronized carriers and non-synchronized carriers.

A non-synchronized carrier refers to a carrier that assumes itself to be a synchronization reference carrier for synchronization. That is, since synchronization signals (e.g. PSS/SSS etc.) necessary for synchronization acquisition are transmitted in the non-synchronized carrier, the UE may autonomously secure synchronization in the non-synchronized carrier.

In contrast, synchronization signals necessary for synchronization acquisition are not transmitted in a synchronized carrier. Instead, the synchronized carrier may set a neighbor carrier (or serving cell) of the same frequency band having similar propagation characteristics and similar channel characteristics as a synchronization reference carrier (or reference cell) and use synchronization information of the reference carrier as synchronization information thereof. That is, the synchronized carrier is synchronized with a carrier other than itself and refers to a carrier that assumes other carriers to be synchronization reference carriers for synchronization acquisition.

For synchronization acquisition in the synchronized carrier, the UE may perform synchronization tracking for the synchronized carrier by receiving a radio signal (e.g. a PSS, an SSS, or an RS) of the synchronization reference carrier during a specific time duration (e.g. a specific subframe having a specific period) in the synchronized carrier. In this case, the UE may be configured to stop operations related to DL data/signal reception etc. in the synchronized carrier during the time duration.

The UE may perform not only synchronization acquisition and maintenance for the synchronization reference carrier but also Reference Signal Received Power (RSRP) measurement, Reference Signal Received Quality (RSRQ) measurement, or Path Loss (PL) measurement for the synchronization reference carrier.

In the embodiments of the present disclosure, the synchronized carrier may have the same meaning as a synchronized serving cell, a synchronized cell, a New Carrier Type (NCT), or a first cell. In addition, the non-synchronized carrier may be used as the same meaning as a synchronization reference carrier, a synchronization carrier, a synchronization reference serving cell, a synchronization reference cell, or a second cell.

3.1 RRM Method-1

Figure 12:
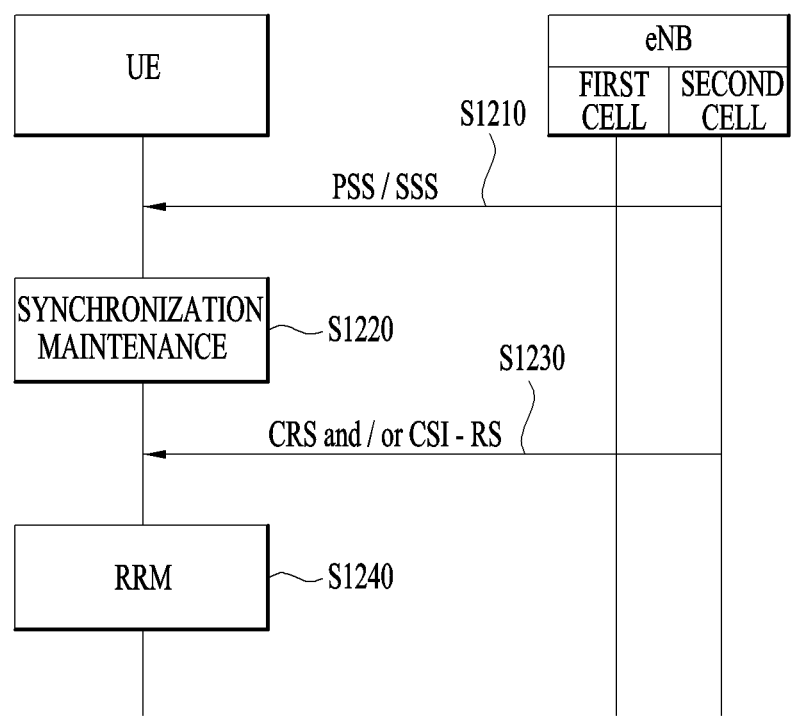
FIG. 12 illustrates an example of a Radio Resource Measurement (RRM) method.

FIG. 12 illustrates an example of an RRM method.

Referring to FIG. 12, it is assumed that an eNB manages two or more cells including a first cell and a second cell. It is also assumed that a UE operates in the first cell which is a synchronized carrier and the second cell is a synchronization reference carrier.

The UE operating in the first cell may acquire and maintain synchronization in the first cell by receiving a PSS, an SSS, and/or an RS transmitted in the second cell which is the synchronization reference carrier during a prescribed subframe duration (S1210 and S1220).

To acquire synchronization of the first cell from the second cell, the first cell and the second cell desirably have similar frequency characteristics. Therefore, when CoMP is supported, neighbor cells may be the first cell and the second cell. When QCL is supported, cells which are positioned at the same geographic location may be the first cell and the second cell.

The UE may perform RRM for the first cell by receiving a CRS and/or a CSI-RS transmitted in the second cell (S1240).

3.2 RRM Method-2

Figure 13:
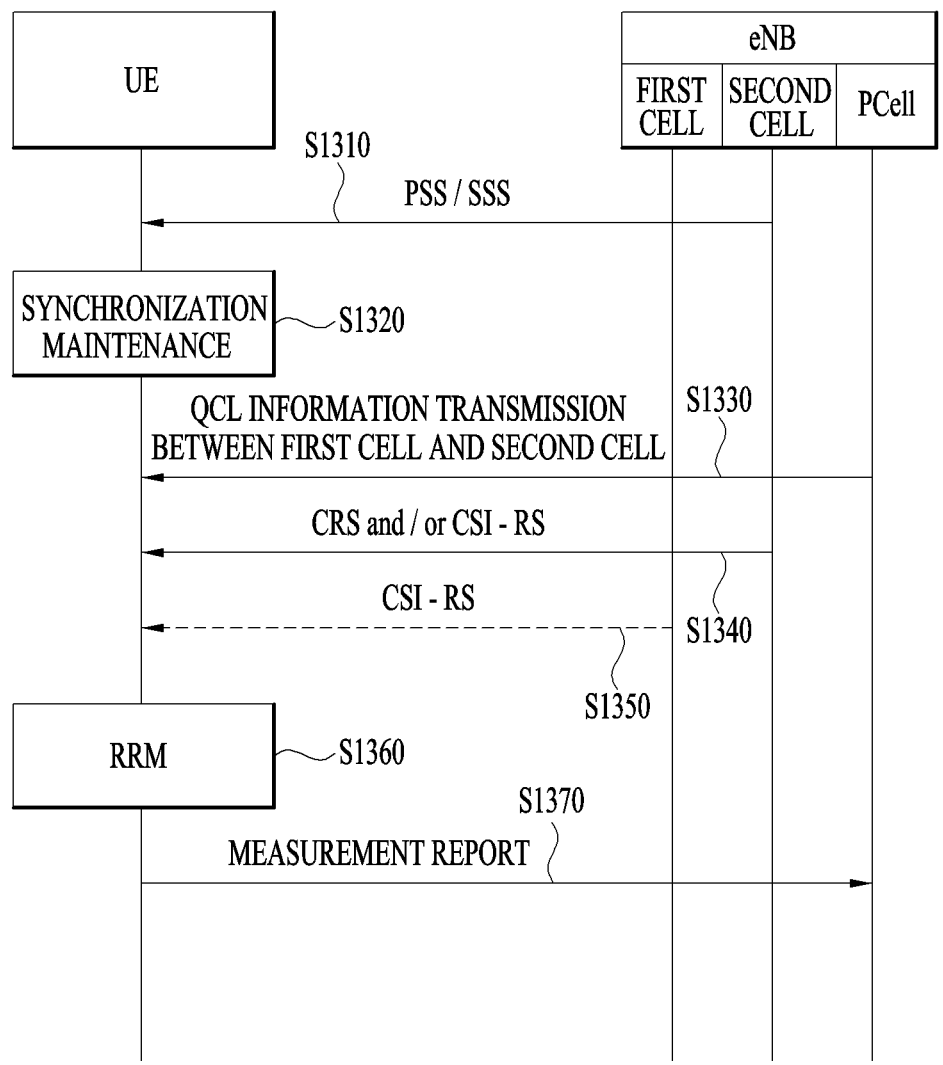
FIG. 13 illustrates another example of an RRM method.

FIG. 13 illustrates another example of an RRM method.

It is assumed that an eNB manages two or more cells including a first cell and a second cell. It is also assumed that a UE operates in the first cell which is a synchronized carrier and the second cell is a synchronization reference carrier. The UE operating in the first cell may maintain synchronization using the second cell and perform RRM using a CSI-RS or a CRS of the first cell.

Hereinafter, the case in which the first cell and the second cell in FIG. 13 are configured as a QCL relationship (refer to section 2.2) will be described.

Referring to FIG. 13, the UE operating in the first cell may maintain synchronization for the first cell using a synchronization signal (PSS/SSS) of the second cell (S1310 and S1320).

The eNB may transmit information related to QCL between the first cell and the second cell through a PCell via higher layer signaling. If the second cell, which is the synchronization reference cell, is the PCell, the UE may receive the QCL related information from the second cell (S1330).

Since it is assumed that the first cell and the second cell are QCL, the UE may receive a CRS and/or a CSI-RS transmitted in the second cell and use the received CRS and/or CSI-RS for RRM for the first cell (S1340 and S1360).

Namely, the UE may perform RRM under the assumption that the CSI-RS of the first cell and the CRS and/or CSI-RS of the second cell are QCL.

Alternatively, if the first cell and the second cell are QCL, the UE may assume that the CSI-RS of the first cell and the CRS and/or CSI-RS of the second cell are QCL. Accordingly, the UE can improve reception performance of a CSI-RS based DL data channel of the first cell upon receiving the CSI-RS of the first cell by applying large-scale properties obtained upon reception of the CRS and/or the CSI-RS of the second cell. (S1350).

Alternatively, the UE may receive the CSI-RS of the first cell based on the large-scale properties obtained through the CRS and/or the CSI-RS of the second cell with which the CSI-RS of the first cell is QCL. In addition, the UE may perform RRM for the first cell using the CSI-RS of the first cell.

Next, the UE may transmit a measurement report message including an RRM result to the PCell of the eNB (S1370).

3.3 RRM Method-3

Figure 14:
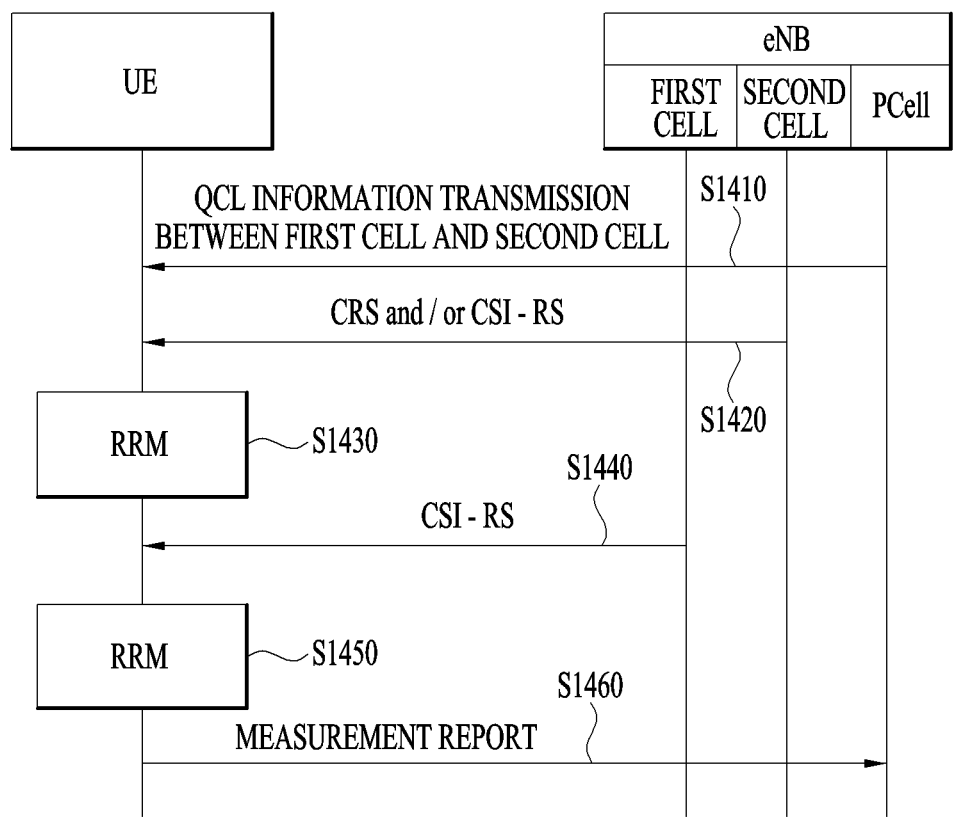
FIG. 14 illustrates another example of an RRM method.

FIG. 14 illustrates another example of an RRM method.

It is assumed that an eNB manages two or more cells including a first cell and a second cell. It is also assumed that a UE operates in the first cell which is a synchronized carrier and the second cell is a synchronization reference carrier. The UE operating in the first cell may maintain synchronization and perform RRM using the second cell and simultaneously perform RRM using a CSI-RS or a CRS of the first cell.

Hereinafter, the case in which the first cell and the second cell in FIG. 14 are configured as QCL (refer to section 2.2) will be described. That is, if the first cell and the second cell are configured as QCL, the UE may perform RRM under the assumption that the CSI-RS of the first cell and a CRS and/or a CSI-RS of the second cell are QCL. In this case, the UE operating in the first cell may maintain synchronization for the first cell using a synchronization signal (PSS/SSS) of the second cell.

Referring to FIG. 14, the eNB may transmit information related to QCL between the first cell and the second cell through a PCell via higher layer signaling. If the second cell which is the synchronization reference cell is the PCell, the UE may receive the QCL related information from the second cell (S1410).

Since it is assumed that the first cell and the second cell are QCL, the UE may receive the CRS and/or the CSI-RS transmitted in the second cell and perform RRM for the first cell (S1420 and S1430).

The UE may acquire large-scale properties through the CRS and/or the CSI-RS received from the second cell and apply the large-scale properties upon receiving the CSI-RS from the first cell (S1440).

Namely, the UE may perform RRM using the CSI-RS received from the first cell (S1450).

In FIG. 14, the UE may separately feed back RRM values measured in steps S1430 and S1450 or may feed back an average of the RRM values to the PCell of the eNB. In other words, the UE may transmit a measurement report message including an RRM result to the PCell of the eNB (S1460).

3.4 RRM Method-4

Another embodiment which is different from the above scheme described with reference to FIG. 14 will now be described. In this case, a basic premise is identical to the above description of FIG. 14.

Notably, in step S1430, the UE may perform only either RSRP measurement or RSRP and PL measurement out of RRM. In this case, in step S1450, either RSRQ measurement or RSRQ and PL measurement which is not performed in step S1430 may be performed.

That is, the UE may perform RSRQ measurement or RSRQ and PL measurement through the first cell and perform RSRP measurement or RPRQ and PL measurement for the first cell through the second cell which is QCL with the first cell.

3.5 RRM Method-5

Another embodiment which is different from the above scheme described with reference to FIG. 14 will now be described. In this case, a basic premise is identical to the above description of FIG. 14.

The UE operating in the first cell may maintain synchronization using the second cell, perform RSRP measurement using a CRS and/or a CSI-RS transmitted in the second cell, and perform interference measurement for RSRQ measurement using a CSI-RS transmitted in the first cell. That is, the UE may perform RSRQ measurement using values obtained from different cells as values for calculating RSRQ. In this case, the UE may perform PL measurement using the CRS/CSI-RS transmitted in the second cell or using a CSI-RS transmitted in the first cell.

Alternatively, the UE may perform RRM under the assumption that the CSI-RS of the first cell and the CRS and/or CSI-RS of the second cell are QCL.

As described in sections 3.1 to 3.5, when antenna ports used in the first cell and the second cell are QCL, the UE may use the CRS and/or the CSI-RS of the second cell for RRM of the first cell.

As another aspect of the present invention, the UE may be configured to select an RS used for RRM according to a QCL assumption. For example, information about QCL of the CSI-RS (or a DM-RS) of the first cell and the CRS and/or the CSI-RS of the second cell may be indicated to the UE via higher layer signaling. In this case, the UE may perform RRM of the first cell using the CRS/CSI-RS of the second cell.

Alternatively, if the information about QCL of the CSI-RS of the first cell and the CRS/CSI-RS of the second cell is not transmitted via higher layer signaling, the UE may perform RRM for the first cell using the CSI-RS of the first cell. For instance, if the QCL information is not transmitted in FIG. 12, the UE may maintain synchronization through the second cell and perform RRM using the CSI-RS of the first cell.

As another aspect of the present invention, if the CSI-RS (or DM-RS) of the first cell is configured to be QCL with a TRS of the first cell, the UE may perform RRM using the TRS of the first cell.

If a QCL relationship between the CSI-RS of the first cell and another RS is not defined for the UE (behavior B without associated indicated CRS), the UE may assume that the NCT of the first cell transmits the TRS.

In the embodiments of the present invention, the UE needs to acquire a cell ID of a measurement target cell and acquire synchronization in order to perform RRM. Therefore, a synchronization reference cell of the first cell may be selected from among measurable cells. In contrast, for a cell (i.e. the second cell) designated as the synchronization reference cell of the first cell, the UE should perform cell measurement. In addition, measurement of the first cell may be configured to be performed with respect to the synchronization reference cell (i.e. the second cell).

4. Method for Adding Synchronized Cell to CA Set

In order to aggregate a synchronized cell (i.e. first cell) to a CA set as an SCell, the UE needs first to perform an RRM procedure or a cell measurement procedure. However, since the first cell does not transmit a synchronization related signal (e.g. a PSS/SSS, a CRS, etc.), the UE cannot directly perform RRM for the first cell.

Therefore, the UE may determine whether to aggregate the first cell to the CA set as the SCell by measuring the second cell instead of the first cell. In this case, the eNB may configure or activate the first cell as the SCell according to a measurement result for the second cell by the UE as in the following methods.

(1) Method 1: The first cell is independently configured and activated.

(2) Method 2: The first cell and the second cell are simultaneously configured.

(3) Method 2-1: The first cell and the second cell are simultaneously configured and the first cell and the second cell are independently activated.

(4) Method 2-2: The first cell and the second cell are simultaneously configured and the first cell and the second cell are always activated at the same time.

In addition, when the first cell is configured and/or activated as the SCell, the eNB may inform the UE that a corresponding cell is the first cell. Alternatively, the eNB may transmit information about the first cell upon directing the UE to perform RRM for the first cell.

4.1 Definition of CP for First Cell and Second Cell

When the first cell, which is a synchronized cell, and the second cell, which is a synchronization reference cell, are configured together, a method for setting the length of a CP will now be described.

When a CP length applied to the second cell is set to be longer than a CP length applied to the first cell, even if the UE acquires timing synchronization in the second cell, it cannot be ensured whether corresponding timing synchronization is equally applied to the first cell. Therefore, methods for setting the CP length applicable to the first cell and the second cell are as follows.

(1) Method A: The second cell has a normal CP length and the first cell has a normal CP length.

(2) Method B: The second cell has a normal CP length and the first cell has an extended CP length.

(3) Method C: The second cell has an extended CP length and the first cell has an extended CP length.

In this case, a characteristic configuration is that the CP length of the second cell and the CP length of the first cell are identically set. That is, Method A or Method C is desirable.

4.2 Definition of Cell ID for First Cell

As described in section 1.5, a maximum number of cell IDs managed by the eNB may be 504. In this case, as the number of serving cells allocated to each UE increases due to CA and an NCT is introduced, the cell IDs may be insufficient. Accordingly, a method for solving problems of cell deployment, which may be caused by cell ID shortage, will be described below.

If the second cell, which is a synchronization reference cell, and the first cell, which is a synchronized cell are configured together and activated, an independent cell ID may not be assigned to the first cell. For example, initialization of scrambling sequences of a PDSCH, a DM-RS, and a CSI-RS using cell IDs as parameters may be performed such that the second cell and the first cell are initialized to the same value using the same parameter.

In more detail, initialization of a scrambling sequence of a PDSCH corresponding to a q-th (where q∈{0,1}) codeword used to initialize a scrambling sequence of a PDSCH transmitted in the first cell may be expressed by Equation 4.

$$c_{init} = \{n_{RNTI} \cdot 2^{14} + q \cdot 2^{13} + \lfloor n_s/2 \rfloor \cdot 2^9 + A \text{ for } PDSCH \quad \text{[Equation 4]}$$

In Equation 4, A denotes a value corresponding to a cell ID of the second cell, a value corresponding to a PCell ID, or a unique value set by a higher layer to replace a cell ID.

By applying the same principle, initialization of a scrambling sequence of a DM-RS used in the first cell may be expressed by Equation 5.

$$c_{init} = (\lfloor n_s/2 \rfloor + 1) \cdot (B+1) \cdot 2^{16} + n_{SCID} \quad \text{[Equation 5]}$$

In Equation 5, B denotes a value corresponding to a cell ID of the second cell, a value corresponding to a PCell ID, or a unique value set by a higher layer to replace a cell ID.

By applying the same principle, initialization of a scrambling sequence of a CSI-RS used in the first cell may be expressed by Equation 6.

$$c_{init} = 2^{10} \cdot (7 \cdot (n_s+1) + l + 1) \cdot (2 \cdot C + 1) + 2 \cdot C + N_{CP} \quad \text{[Equation 6]}$$

In Equation 6, C denotes a value corresponding to a cell ID of the second cell, a value corresponding to a PCell ID, or a unique value set by a higher layer to replace a cell ID.

4.3 Out-of-Synchronization 4.3.1 Definition of Out-of-Synchronization in LTE System In the LTE system, out-of-synchronization is defined as follows.

(1) The UE should monitor DL quality based on a CRS in order to detect DL radio link quality of a PCell.

(2) The UE should estimate DL radio link quality and compare the radio link quality with threshold values $Q_{out}$ and $Q_{in}$ in order to monitor the DL radio link quality of the PCell.

(3) The threshold value $Q_{out}$ is defined as a level at which a DL radio link is not reliably received, i.e. a value corresponding to a block error rate of 10% of PDCCH transmission considering a PCFICH including a transmission parameter.

(4) The threshold value $Q_{in}$ is defined as a level at which DL radio link quality is more significantly and reliably received than at Qout, i.e. a value corresponding to a block error rate of 2% of PDCCH transmission considering a PCFICH including a transmission parameter.

4.3.2 Case of Method 1

As described in Method 1, the first cell may be independently configured and activated with respect to the second cell. In this case, the first cell may be an SCell and out-of-synchronization may be configured to conform to a PCell. That is, the UE monitors out-of-synchronization only in the PCell and regards all SCells as out-of-synchronization when the PCell is out-of-synchronization. In addition, the first cell activated as the SCell may be deactivated according to an RRM result for the second cell.

4.3.3 Definition of Out-of-Synchronization in NCT

If a specific serving cell or CC does not transmit a legacy PDCCH so that compatibility with a legacy system is not satisfied and a new type of PDCCH (e.g. E-PDCCH) is transmitted, the following new determination criteria for out-of-synchronization is needed.

(1) Method I: Out-of-synchronization is determined by measuring DL radio link quality using a CSI-RS and then mapping an error rate of a new PDCCH.

(2) Method II: Out-of-synchronization is determined by measuring a CRS or a CSI-RS of the second cell and then mapping an error rate of a new PDCCH.

(3) Method III: Out-of-synchronization is determined by measuring a DM-RS used to demodulate a new type of PDCCH and then mapping an error rate of the new type of PDCCH.

The second cell, which is a non-synchronized cell, may secure synchronization by transmitting a signal (e.g. a PSS/SSS) necessary for synchronization. The PSS/SSS may be transmitted in specific subframes (e.g. subframe indexes 0 and 5) of a radio frame.

An RS used to demodulate a PDSCH is categorized into a CRS and a UE-RS according to Transmission Mode (TM). In a legacy LTE Rel-10 system, an FDD UE-RS may overlap a PSS/SSS in a symbol position.

In this case, the UE-RS may be configured not to be transmitted on a time/frequency resource on which the PSS/SSS is transmitted so that collision between the PSS/SSS and DL data can be avoided. Notably, PDSCH data is discarded on the time/frequency resource on which the PSS/SSS is transmitted.

Alternatively, the eNB may transmit the PDSCH data by resetting the location of the UE-RS in a subframe in which the PSS/SSS is transmitted.

Figure 15:
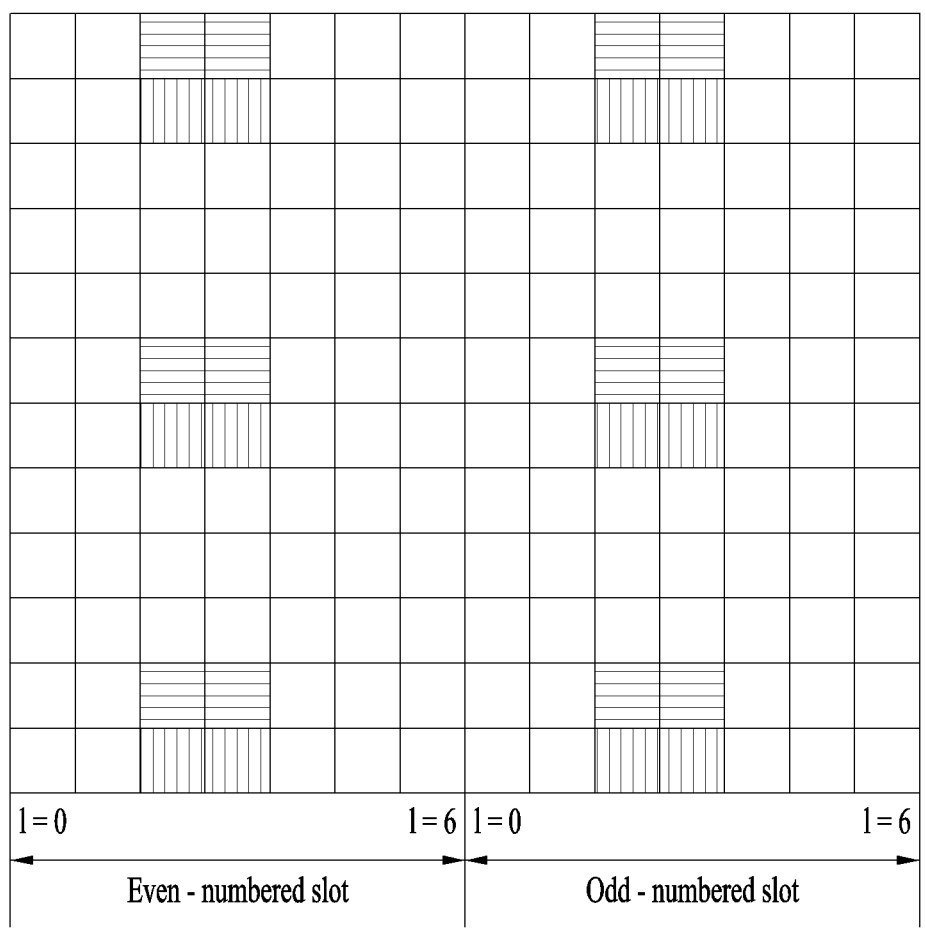
FIG. 15 illustrates an example of a UE-RS pattern in a serving cell to which a normal Cyclic Prefix (CP) is applied in FDD.

FIG. 15 illustrates an example of a UE-RS pattern in a serving cell to which a normal CP is applied in FDD.

Refer to FIG. 15, a horizontal grid illustrates UE-RSs for antenna ports 7, 8, 11, and 13 and a vertical grid illustrates UE-RSs for antenna ports 9, 10, 12, and 14.

The UE-RS pattern illustrated in FIG. 15 may be effectively configured only in subframes (e.g. subframes 0 and 5) in which a PSS/SSS is transmitted. More restrictedly, the UE-RS pattern may be effectively configured only in a frequency resource (e.g. 6 RBs) on which the PSS/SSS is transmitted.

If a CSI-RS is configured in a subframe in which the PSS/SSS is transmitted, the CSI-RS may be configured not to be transmitted when the CSI-RS is allocated to overlap the UE-RS defined in FIG. 15 on an RE.

As another method, a subframe in which the CSI-RS is transmitted may be configured not to overlap a subframe in which the PSS/SSS is transmitted so that collision between RE positions of the CSI-RS and the UE-RS can be avoided.

5. Apparatus

Figure 16:
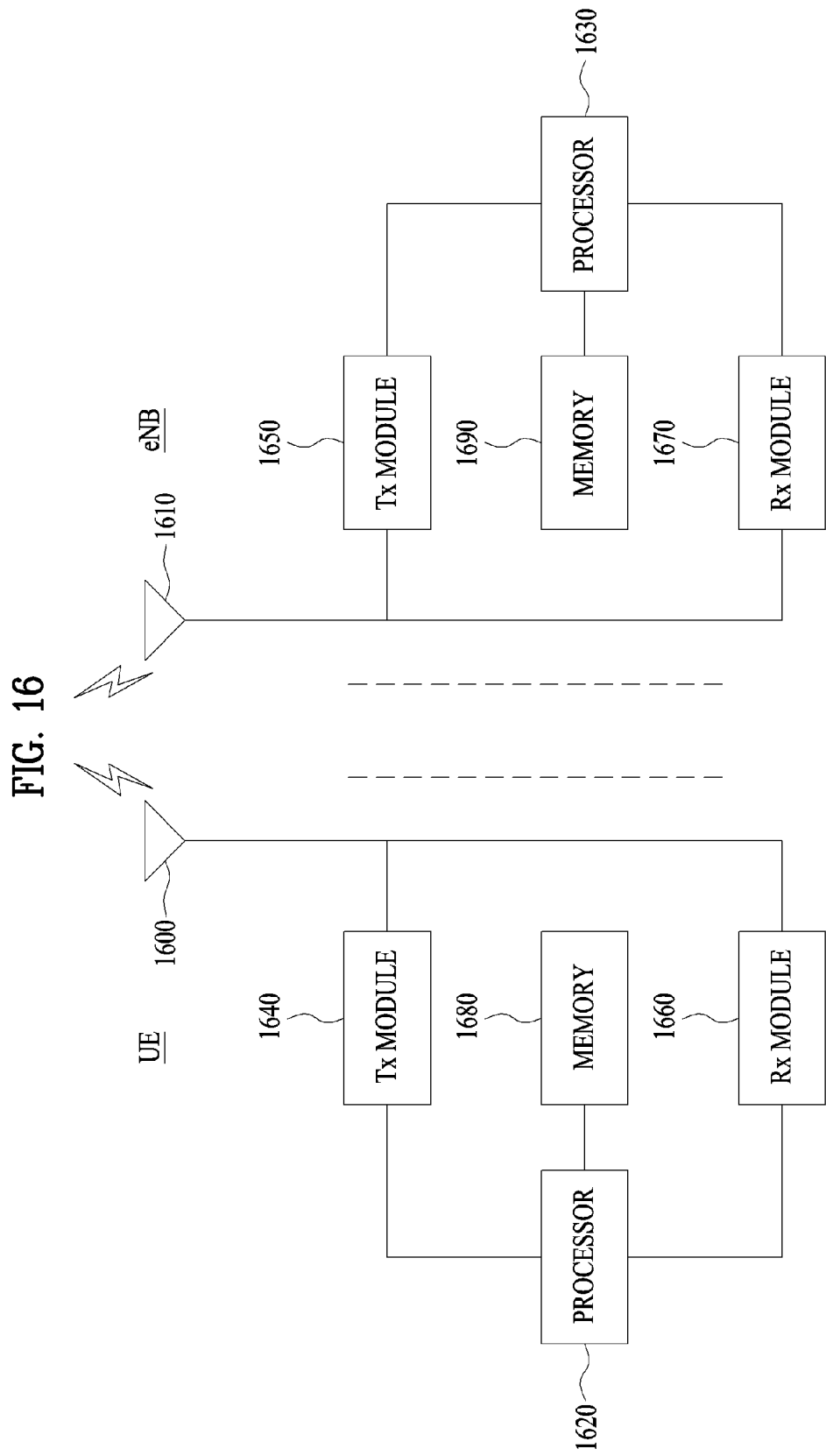
FIG. 16 illustrates means that can implement the methods described with reference to FIGS. 1 to 11.

Apparatuses illustrated in FIG. 16 are means that can implement the methods described before with reference to FIGS. 1 to 15.

A UE may act as a transmitter on a UL and as a receiver on a DL. An eNB may act as a receiver on a UL and as a transmitter on a DL.

That is, each of the UE and the eNB may include a Transmission (Tx) module 1640 or 1650 and a Reception (Rx) module 1660 or 1670, for controlling transmission and reception of information, data, and/or messages, and an antenna 1600 or 1610 for transmitting and receiving information, data, and/or messages.

Each of the UE and the eNB may further include a processor 1620 or 1630 for implementing the afore-described embodiments of the present disclosure and a memory 1680 or 1690 for temporarily or permanently storing operations of the processor 1620 or 1630.

The embodiments of the present invention may be performed using the components and functions of the above-described UE and eNB. For example, the processor of the UE may perform RRM for the first cell using a CRS/CSI-RS of the second cell when a CSI-RS of the first cell and the CRS and/or CSI-RS of the second cell are QCL and report a measurement result to the eNB. In addition, the processor of the eNB may manage two or more serving cells and transmit QCL information between cells to the UE, so that the UE may perform a QCL related operation. For details, refers to the contents described in sections 1 to 4.

The Tx and Rx modules of the UE and the eNB may perform a packet modulation/demodulation function for data transmission, a high-speed packet channel coding function, OFDMA packet scheduling, TDD packet scheduling, and/or channelization. Each of the UE and the eNB of FIG. 16 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 1680 or 1690 and executed by the processor 1620 or 1630. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, a 3GPP2 system, and/or an IEEE 802.xx system. Besides these wireless access systems, the embodiments of the present disclosure are applicable to all technical fields in which the wireless access systems find their applications.

The invention claimed is:

1. A method for performing a Radio Resource Measurement (RRM) by a User Equipment (UE) in a radio access system, the method comprising:
receiving a higher layer signal including information about Quasi Co-Location (QCL) between a Channel State Information Reference Signal (CSI-RS) of a first cell and at least one of a Cell-specific Reference Signal (CRS) and a CSI-RS of a second cell;
receiving the at least one of the CRS and the CSI-RS of the second cell based on the information about QCL;
selecting the at least one of the CRS and the CSI-RS of the second cell indicated by the information about QCL; and
performing a first RRM for the first cell using the selected at least one of the CRS and the CSI-RS of the second cell.

2. The method according to claim 1,
wherein synchronization for the first cell is maintained using a synchronization signal transmitted in the second cell.

3. The method according to claim 1, further comprising performing a second RRM for the first cell using the CSI-RS of the first cell.

4. The method according to claim 3,
wherein the first RRM includes one or more of a Reference Signal Received Power (RSRP) measurement and a Path Loss (PL) measurement, and
the second RRM includes one or more of a Reference Signal Received Quality (RSRQ) and a PL measurement.

5. The method according to claim 1,
wherein the first cell is a synchronized cell in which a synchronization signal is not transmitted,
the second cell is a synchronization reference cell in which the synchronization signal is transmitted, and
the UE does not receive a downlink signal from the first cell while the UE receives the CRS and/or the CSI-RS from the second cell.

6. The method according to claim 1,
wherein the first cell is a New Carrier Type (NCT) to which one or more of a synchronization signal, a CRS, a downlink broadcast channel, and a downlink control channel are not allocated, and
the second cell is a legacy serving cell.

7. A User Equipment (UE) for performing a Radio Resource Measurement (RRM) in a radio access system, the UE comprising:
a transmitter;
a receiver; and
a processor supporting the RRM, wherein the processor:
receives a higher layer signal including information about Quasi Co-Location (QCL) between a Channel State Information Reference Signal (CSI-RS) of a first cell and at least one of a Cell-specific Reference Signal (CRS) and a CSI-RS of a second cell through the receiver;
receives the at least one of the CRS and the CSI-RS of the second cell based on the information about QCL through the receiver;
selects the at least one of the CRS and the CSI-RS of the second cell indicated by the information about QCL; and
performs a first RRM for the first cell using the selected at least one of the CRS and the CSI-RS of the second cell.

8. The UE according to claim 7,
wherein synchronization for the first cell is maintained using a synchronization signal transmitted in the second cell.

9. The UE according to claim 7, wherein the processor further performs a second RRM for the first cell using the CSI-RS of the first cell.

10. The UE according to claim 9,
wherein the first RRM includes one or more of a Reference Signal Received Power (RSRP) measurement and a Path Loss (PL) measurement, and
the second RRM includes one or more of a Reference Signal Received Quality (RSRQ) and a PL measurement.

11. The UE according to claim 7,
wherein the first cell is a synchronized cell in which a synchronization signal is not transmitted,
the second cell is a synchronization reference cell in which the synchronization signal is transmitted, and
the UE does not receive a downlink signal from the first cell while the UE receives the CRS and/or the CSI-RS from the second cell.

12. The UE according to claim 7,
wherein the first cell is a New Carrier Type (NCT) to which one or more of a synchronization signal, a CRS, a downlink broadcast channel, and a downlink control channel are not allocated, and
the second cell is a legacy serving cell.

* * * * *